US012576579B2

(12) United States Patent
Dunn et al.

(10) Patent No.: US 12,576,579 B2
(45) Date of Patent: Mar. 17, 2026

(54) METHOD OF MANUFACTURING A DOOR FRAME SUBASSEMBLY FOR AN ELECTRONIC DISPLAY ASSEMBLY

(71) Applicant: Manufacturing Resources International, Inc., Alpharetta, GA (US)

(72) Inventors: William Dunn, Alpharetta, GA (US); Tim Hubbard, Alpharetta, GA (US); Fletcher Bean, Alpharetta, GA (US); Matt Dosch, Alpharetta, GA (US)

(73) Assignee: Manufacturing Resources International, Inc., Alpharetta, GA (US)

( * ) Notice: Subject to any disclaimer, the term of this patent is extended or adjusted under 35 U.S.C. 154(b) by 0 days.

(21) Appl. No.: 18/898,796

(22) Filed: Sep. 27, 2024

(65) Prior Publication Data

US 2025/0108552 A1 Apr. 3, 2025

Related U.S. Application Data

(60) Provisional application No. 63/625,442, filed on Jan. 26, 2024, provisional application No. 63/541,567, filed on Sep. 29, 2023.

(51) Int. Cl.
B29C 53/08 (2006.01)
B21C 23/12 (2006.01)
(Continued)

(52) U.S. Cl.
CPC ............ B29C 53/083 (2013.01); B21C 23/12 (2013.01); B29C 53/40 (2013.01); B29C 53/84 (2013.01); B29L 2031/3475 (2013.01)

(58) Field of Classification Search
CPC ........ A47G 1/065; A47G 1/06; B29C 53/083; B29C 53/40; B29C 53/84; B21C 23/00; B21C 23/01; B21C 23/12
See application file for complete search history.

(56) References Cited

U.S. PATENT DOCUMENTS 2,553,961 A 5/1951 Dreyer
2,907,102 A 10/1959 Armstrong et al.
(Continued)

FOREIGN PATENT DOCUMENTS

AU 2003242399 B2 11/2003
AU 2003285975 A1 6/2004
(Continued)

OTHER PUBLICATIONS

Dave Roos, How Transmissive Film Works, 2008, 9 Pages.
(Continued)

*Primary Examiner* — Thu Khanh T. Nguyen
(74) *Attorney, Agent, or Firm* — Standley Law Group LLP; Jeffrey S. Standley; Adam J. Smith

(57) ABSTRACT

Methods of manufacturing a door frame subassembly for an electronic display assembly and related systems and apparatuses are disclosed. A material is extruded to form a frame. The material is bent into a rectangular shape with rounded corners to define an opening. Notches may be formed in the frame to facilitate the bending. A remaining gap in the material is joined, such as by a bracket at a lower portion of the opening to secure the frame to itself.

13 Claims, 29 Drawing Sheets

(51) Int. Cl.
    *B29C 53/40*        (2006.01)
    *B29C 53/84*        (2006.01)
    *B29L 31/34*        (2006.01)

(56)         References Cited

U.S. PATENT DOCUMENTS

| 2,986,379 | A |  | 5/1961 | Kramig, Jr. |
| 3,784,586 | A |  | 1/1974 | Thomas et al. |
| 3,823,794 | A |  | 7/1974 | Bre |
| 3,858,965 | A |  | 1/1975 | Sumita |
| 4,007,552 | A |  | 2/1977 | Brooks |
| 4,093,355 | A |  | 6/1978 | Kaplit et al. |
| 4,261,145 | A | * | 4/1981 | Brocking ............ E06B 3/66314 |
|  |  |  |  | 72/149 |
| 4,297,401 | A |  | 10/1981 | Chern et al. |
| 4,299,639 | A |  | 11/1981 | Bayer |
| 4,378,137 | A |  | 3/1983 | Gibson et al. |
| 4,593,978 | A |  | 6/1986 | Mourey et al. |
| 4,604,444 | A |  | 8/1986 | Donnadieu et al. |
| 4,634,225 | A |  | 1/1987 | Haim et al. |
| 4,640,584 | A |  | 2/1987 | Tsuboyama et al. |
| 4,691,995 | A |  | 9/1987 | Yamazaki et al. |
| 4,712,875 | A |  | 12/1987 | Tsuboyama et al. |
| 4,715,686 | A |  | 12/1987 | Iwashita et al. |
| 4,724,023 | A |  | 2/1988 | Marriott |
| 4,766,176 | A |  | 8/1988 | Lee et al. |
| 4,896,218 | A |  | 1/1990 | Vick |
| 4,950,344 | A |  | 8/1990 | Glover et al. |
| 5,029,982 | A |  | 7/1991 | Nash |
| 5,059,484 | A |  | 10/1991 | Clark et al. |
| 5,066,699 | A |  | 11/1991 | Lee et al. |
| 5,088,806 | A |  | 2/1992 | McCartney et al. |
| 5,148,591 | A |  | 9/1992 | Pryor |
| 5,247,374 | A |  | 9/1993 | Terada |
| 5,330,262 | A |  | 7/1994 | Peters |
| 5,365,354 | A |  | 11/1994 | Jannson et al. |
| 5,379,139 | A |  | 1/1995 | Sato et al. |
| 5,402,141 | A |  | 3/1995 | Haim et al. |
| 5,406,399 | A |  | 4/1995 | Koike |
| 5,547,483 | A |  | 8/1996 | Garcia et al. |
| 5,548,038 | A |  | 8/1996 | Enami et al. |
| 5,559,614 | A |  | 9/1996 | Urbish et al. |
| 5,601,915 | A |  | 2/1997 | Ochi et al. |
| 5,606,438 | A |  | 2/1997 | Margalit et al. |
| 5,610,742 | A |  | 3/1997 | Hinata et al. |
| 5,656,824 | A |  | 8/1997 | den Boer et al. |
| 5,661,210 | A |  | 8/1997 | Burns et al. |
| 5,748,269 | A |  | 5/1998 | Harris et al. |
| 5,767,489 | A |  | 6/1998 | Ferrier |
| 5,818,010 | A |  | 10/1998 | McCann |
| 5,823,031 | A |  | 10/1998 | Campbell et al. |
| 5,838,405 | A |  | 11/1998 | Izumi et al. |
| 5,852,484 | A |  | 12/1998 | Inoue et al. |
| 5,869,919 | A |  | 2/1999 | Sato et al. |
| 5,899,027 | A |  | 5/1999 | St. Louis |
| 5,911,899 | A |  | 6/1999 | Yoshikai et al. |
| 5,937,611 | A |  | 8/1999 | Howes |
| 5,991,153 | A |  | 11/1999 | Heady et al. |
| 6,020,945 | A |  | 2/2000 | Sawai et al. |
| 6,074,741 | A |  | 6/2000 | Murata et al. |
| 6,089,751 | A |  | 7/2000 | Conover et al. |
| 6,099,672 | A |  | 8/2000 | Yamazaki et al. |
| 6,157,432 | A |  | 12/2000 | Helbing |
| 6,191,839 | B1 |  | 2/2001 | Briley et al. |
| 6,198,515 | B1 |  | 3/2001 | Cole |
| 6,211,934 | B1 |  | 4/2001 | Habing et al. |
| 6,219,127 | B1 |  | 4/2001 | Hirakata et al. |
| 6,359,390 | B1 |  | 3/2002 | Nagai |
| 6,392,727 | B1 |  | 5/2002 | Larson et al. |
| 6,398,371 | B1 |  | 6/2002 | Matsunaga et al. |
| 6,417,900 | B1 |  | 7/2002 | Shin et al. |
| 6,421,103 | B2 |  | 7/2002 | Yamaguchi |
| 6,437,673 | B1 |  | 8/2002 | Nishida et al. |
| 6,446,467 | B1 |  | 9/2002 | Lieberman et al. |
| 6,451,870 | B1 |  | 9/2002 | DeCato et al. |
| 6,465,092 | B1 |  | 10/2002 | Takushima et al. |
| 6,472,032 | B1 |  | 10/2002 | Asano |
| 6,504,713 | B1 |  | 1/2003 | Pandolfi et al. |
| 6,512,562 | B1 |  | 1/2003 | Kobayashi et al. |
| 6,535,266 | B1 |  | 3/2003 | Nemeth et al. |
| 6,555,235 | B1 |  | 4/2003 | Aufderheide et al. |
| 6,611,302 | B1 |  | 8/2003 | Ueda et al. |
| 6,628,355 | B1 |  | 9/2003 | Takahara |
| 6,650,393 | B1 |  | 11/2003 | Nishiguchi |
| 6,683,639 | B2 |  | 1/2004 | Driessen-Olde Scheper et al. |
| 6,692,986 | B1 |  | 2/2004 | Bayer et al. |
| 6,727,468 | B1 |  | 4/2004 | Nemeth |
| 6,731,357 | B1 |  | 5/2004 | Tachibana et al. |
| 6,731,367 | B1 |  | 5/2004 | Saitoh |
| 6,747,720 | B2 |  | 6/2004 | Saiki et al. |
| 6,762,471 | B2 |  | 7/2004 | Kim |
| 6,779,252 | B2 |  | 8/2004 | Tracy et al. |
| 6,818,721 | B2 |  | 11/2004 | Zha et al. |
| 6,825,899 | B2 |  | 11/2004 | Kobayashi |
| 6,830,348 | B2 |  | 12/2004 | Nakamura et al. |
| 6,839,104 | B2 |  | 1/2005 | Taniguchi et al. |
| 6,873,387 | B2 |  | 3/2005 | Hokazono et al. |
| 6,885,412 | B2 |  | 4/2005 | Ohnishi et al. |
| 6,909,486 | B2 |  | 6/2005 | Wang et al. |
| 6,943,768 | B2 |  | 9/2005 | Cavanaugh et al. |
| 6,955,833 | B1 |  | 10/2005 | Gallego |
| 6,961,108 | B2 |  | 11/2005 | Wang et al. |
| 7,052,152 | B2 |  | 5/2006 | Harbers et al. |
| 7,059,757 | B2 |  | 6/2006 | Shimizu |
| 7,083,285 | B2 |  | 8/2006 | Hsu et al. |
| 7,131,313 | B2 |  | 11/2006 | Nakazato |
| 7,161,642 | B2 |  | 1/2007 | Kim et al. |
| 7,194,158 | B2 |  | 3/2007 | Schultheis et al. |
| 7,218,812 | B2 |  | 5/2007 | Maxwell et al. |
| 7,230,659 | B2 |  | 6/2007 | Ha et al. |
| 7,232,250 | B2 |  | 6/2007 | Chuang |
| 7,283,185 | B2 |  | 10/2007 | Hirakata et al. |
| 7,295,179 | B2 |  | 11/2007 | Dunn |
| 7,481,553 | B2 |  | 1/2009 | Kim et al. |
| 7,481,566 | B2 |  | 1/2009 | Han |
| 7,633,583 | B2 |  | 12/2009 | Wang et al. |
| 7,798,694 | B2 |  | 9/2010 | Hwang |
| 7,811,640 | B2 |  | 10/2010 | Charters et al. |
| 7,812,919 | B2 |  | 10/2010 | Chien et al. |
| 7,922,381 | B2 |  | 4/2011 | Han et al. |
| 7,923,071 | B2 |  | 4/2011 | Charters et al. |
| 7,924,362 | B2 |  | 4/2011 | Slobodin |
| 8,004,648 | B2 |  | 8/2011 | Dunn |
| 8,009,262 | B2 |  | 8/2011 | Dunn |
| 8,021,900 | B2 |  | 9/2011 | Maxwell et al. |
| 8,120,595 | B2 |  | 2/2012 | Kukulj et al. |
| 8,208,115 | B2 |  | 6/2012 | Dunn |
| 8,242,974 | B2 |  | 8/2012 | Yamazaki et al. |
| 8,269,916 | B2 |  | 9/2012 | Ohkawa |
| 8,274,626 | B2 |  | 9/2012 | Choi et al. |
| 8,294,168 | B2 |  | 10/2012 | Park et al. |
| 8,529,993 | B2 |  | 9/2013 | Charters et al. |
| 8,562,770 | B2 |  | 10/2013 | Dunn et al. |
| 8,674,390 | B2 |  | 3/2014 | Harris et al. |
| 8,674,963 | B2 |  | 3/2014 | Cornish et al. |
| 8,711,321 | B2 |  | 4/2014 | Dunn et al. |
| 8,827,472 | B2 |  | 9/2014 | Takada |
| 8,879,042 | B2 |  | 11/2014 | Dunn |
| 9,317,060 | B2 |  | 4/2016 | Dunn et al. |
| 9,573,346 | B2 |  | 2/2017 | Dunn et al. |
| 9,756,739 | B2 |  | 9/2017 | Russell-Clarke et al. |
| 9,950,500 | B2 |  | 4/2018 | Dunn et al. |
| 10,730,269 | B2 |  | 8/2020 | Dunn et al. |
| 11,591,261 | B2 |  | 2/2023 | Dunn et al. |
| 12,055,809 | B2 |  | 8/2024 | Dunn et al. |
| 12,071,372 | B2 |  | 8/2024 | Dunn et al. |
| 2001/0001459 | A1 |  | 5/2001 | Savant et al. |
| 2001/0019454 | A1 |  | 9/2001 | Tadic-Galeb et al. |
| 2001/0043293 | A1 |  | 11/2001 | Inoue |
| 2002/0033919 | A1 |  | 3/2002 | Sanelle et al. |
| 2002/0042162 | A1 |  | 4/2002 | Tone et al. |
| 2002/0101553 | A1 |  | 8/2002 | Enomoto et al. |
| 2002/0126248 | A1 |  | 9/2002 | Yoshida |
| 2002/0149714 | A1 |  | 10/2002 | Anderson et al. |

(56) References Cited

U.S. PATENT DOCUMENTS

| | | |
|---|---|---|
| 2002/0186333 A1 | 12/2002 | Ha et al. |
| 2002/0187575 A1 | 12/2002 | Maruyama et al. |
| 2003/0007109 A1 | 1/2003 | Park |
| 2003/0026085 A1 | 2/2003 | Ueda et al. |
| 2003/0090810 A1 | 5/2003 | Detro et al. |
| 2004/0018375 A1 | 1/2004 | Banno et al. |
| 2004/0032638 A1 | 2/2004 | Tonar et al. |
| 2004/0036834 A1 | 2/2004 | Ohnishi et al. |
| 2004/0062029 A1 | 4/2004 | Ato |
| 2004/0105159 A1 | 6/2004 | Saccomanno et al. |
| 2004/0113044 A1 | 6/2004 | Ishiguchi |
| 2004/0145805 A1 | 7/2004 | Qiu |
| 2004/0155997 A1 | 8/2004 | West et al. |
| 2004/0165139 A1 | 8/2004 | Anderson et al. |
| 2004/0239823 A1 | 12/2004 | Silsby et al. |
| 2005/0012722 A1 | 1/2005 | Chon |
| 2005/0062373 A1 | 3/2005 | Kim et al. |
| 2005/0073632 A1 | 4/2005 | Dunn et al. |
| 2005/0073640 A1 | 4/2005 | Dunn et al. |
| 2005/0105178 A1 | 5/2005 | Kim |
| 2005/0115670 A1 | 6/2005 | Bettinelli et al. |
| 2005/0117110 A1 | 6/2005 | Byun et al. |
| 2005/0134526 A1 | 6/2005 | Willem et al. |
| 2005/0212990 A1 | 9/2005 | Robinder |
| 2005/0286131 A1 | 12/2005 | Saxena et al. |
| 2006/0082271 A1 | 4/2006 | Lee et al. |
| 2006/0082700 A1 | 4/2006 | Gehlsen et al. |
| 2006/0092348 A1 | 5/2006 | Park |
| 2006/0103299 A1 | 5/2006 | Kwok et al. |
| 2006/0132699 A1 | 6/2006 | Cho et al. |
| 2006/0159867 A1 | 7/2006 | O'Donnell |
| 2006/0209266 A1 | 9/2006 | Utsunomiya |
| 2006/0262258 A1 | 11/2006 | Wang et al. |
| 2006/0274237 A1 | 12/2006 | Nelson et al. |
| 2006/0279946 A1 | 12/2006 | Park et al. |
| 2006/0289201 A1 | 12/2006 | Kim et al. |
| 2007/0065091 A1 | 3/2007 | Hinata et al. |
| 2007/0103854 A1 | 5/2007 | Yu et al. |
| 2007/0139574 A1 | 6/2007 | Ko et al. |
| 2007/0151664 A1 | 7/2007 | Shin |
| 2007/0200095 A1 | 8/2007 | Murazaki |
| 2007/0206158 A1 | 9/2007 | Kinoshita et al. |
| 2007/0230218 A1 | 10/2007 | Jachim et al. |
| 2007/0267174 A1 | 11/2007 | Kim |
| 2007/0268201 A1 | 11/2007 | Sampsell et al. |
| 2007/0279556 A1 | 12/2007 | Wang et al. |
| 2008/0049164 A1 | 2/2008 | Jeon et al. |
| 2008/0083906 A1 | 4/2008 | Takahara et al. |
| 2008/0111949 A1 | 5/2008 | Shibata et al. |
| 2008/0111958 A1 | 5/2008 | Kleverman et al. |
| 2008/0146709 A1 | 6/2008 | Aketa et al. |
| 2008/0151082 A1 | 6/2008 | Chan |
| 2008/0176345 A1 | 7/2008 | Yu et al. |
| 2008/0230177 A1 | 9/2008 | Crouser et al. |
| 2008/0261057 A1 | 10/2008 | Slobodin |
| 2008/0284942 A1 | 11/2008 | Mahama et al. |
| 2008/0315734 A1 | 12/2008 | Birsel et al. |
| 2009/0015747 A1 | 1/2009 | Nishizawa et al. |
| 2009/0015761 A1 | 1/2009 | Stockham |
| 2009/0021915 A1 | 1/2009 | Kuo |
| 2009/0088547 A1 | 4/2009 | Schamschurin et al. |
| 2009/0104989 A1 | 4/2009 | Williams et al. |
| 2009/0153780 A1 | 6/2009 | Takata |
| 2009/0251650 A1 | 10/2009 | Fukagawa et al. |
| 2010/0039696 A1 | 2/2010 | de Groot et al. |
| 2010/0043966 A1 | 2/2010 | Dunn et al. |
| 2010/0098839 A1 | 4/2010 | Toyoda et al. |
| 2010/0253660 A1 | 10/2010 | Hashimoto |
| 2010/0302777 A1 | 12/2010 | Knoll et al. |
| 2010/0307800 A1 | 12/2010 | Wee et al. |
| 2011/0019363 A1 | 1/2011 | Vahlsing et al. |
| 2011/0090630 A1 | 4/2011 | Bergeron et al. |
| 2011/0151197 A1 | 6/2011 | Charters et al. |
| 2011/0194053 A1 | 8/2011 | Tannas |
| 2011/0205472 A1 | 8/2011 | Kobayashi et al. |
| 2011/0220639 A1* | 9/2011 | Gerhardinger ........... H05B 3/84 |
| | | 219/660 |
| 2011/0221995 A1 | 9/2011 | Park |
| 2012/0050958 A1 | 3/2012 | Sanford et al. |
| 2012/0069273 A1 | 3/2012 | Watanabe |
| 2012/0111479 A1 | 5/2012 | Sung et al. |
| 2012/0154712 A1 | 6/2012 | Yu et al. |
| 2012/0194998 A1* | 8/2012 | McClure ................. H01Q 1/42 |
| | | 361/679.56 |
| 2012/0242926 A1 | 9/2012 | Hsu et al. |
| 2012/0275023 A1 | 11/2012 | Weber et al. |
| 2012/0287368 A1 | 11/2012 | Que et al. |
| 2012/0295051 A1 | 11/2012 | Dunn et al. |
| 2013/0027633 A1 | 1/2013 | Park et al. |
| 2013/0051200 A1 | 2/2013 | Oshio |
| 2013/0094160 A1 | 4/2013 | Narumi |
| 2013/0163277 A1 | 6/2013 | Kim et al. |
| 2013/0185973 A1* | 7/2013 | Scheyer ................. A47G 1/065 |
| | | 40/735 |
| 2013/0206063 A1 | 8/2013 | Van Rensburg et al. |
| 2013/0329363 A1 | 12/2013 | Dunn et al. |
| 2014/0118221 A1 | 5/2014 | Park et al. |
| 2014/0268657 A1 | 9/2014 | Dunn et al. |
| 2014/0285732 A1 | 9/2014 | Tanabe et al. |
| 2014/0321103 A1 | 10/2014 | Dunn et al. |
| 2015/0177480 A1 | 6/2015 | Bullock et al. |
| 2015/0328671 A1 | 11/2015 | Ilinich et al. |
| 2016/0037657 A1 | 2/2016 | Yoshizumi |
| 2017/0210668 A1 | 7/2017 | Dunn et al. |
| 2017/0242290 A1 | 8/2017 | Jenkins et al. |
| 2018/0086954 A1 | 3/2018 | Morioka et al. |
| 2018/0200999 A1 | 7/2018 | Dunn et al. |
| 2018/0366685 A1 | 12/2018 | Park et al. |
| 2019/0071919 A1* | 3/2019 | McGlinchy ............. B29C 48/12 |
| 2020/0214147 A1 | 7/2020 | Li et al. |
| 2020/0285099 A1 | 9/2020 | Wang et al. |
| 2021/0046746 A1 | 2/2021 | Xie |
| 2021/0081156 A1* | 3/2021 | Saavedra ............... A47G 1/065 |
| 2022/0161309 A1 | 5/2022 | Gambino |
| 2022/0260872 A1 | 8/2022 | Dunn et al. |
| 2023/0002558 A1 | 1/2023 | Hedge et al. |
| 2023/0159387 A1 | 5/2023 | Dunn et al. |
| 2023/0418101 A1 | 12/2023 | Dunn et al. |

FOREIGN PATENT DOCUMENTS

| | | |
|---|---|---|
| AU | 2006214795 A1 | 8/2007 |
| CN | 1720282 A | 1/2006 |
| CN | 101142532 A | 3/2008 |
| CN | 101541863 A | 9/2009 |
| CN | 102202860 A | 9/2011 |
| CN | 202815379 U | 3/2013 |
| EP | 1576033 A1 | 9/2005 |
| EP | 1640337 A2 | 3/2006 |
| EP | 1678534 A1 | 7/2006 |
| EP | 1851591 A1 | 11/2007 |
| EP | 1923406 A1 | 5/2008 |
| EP | 4291826 A1 | 12/2023 |
| GB | 2402205 A | 12/2004 |
| JP | 62197335 A | 9/1987 |
| JP | 3153212 A | 7/1991 |
| JP | 8194437 A | 7/1996 |
| JP | H08271883 A | 10/1996 |
| JP | 11160727 A | 6/1999 |
| JP | 2002158475 A | 5/2002 |
| JP | 2004205599 A | 7/2004 |
| JP | 2005029579 A | 2/2005 |
| JP | 2005055641 A | 3/2005 |
| JP | 2005121940 A | 5/2005 |
| JP | 2005134849 A | 5/2005 |
| JP | 2005225793 A | 8/2005 |
| JP | 2006508216 A | 9/2006 |
| JP | 2008530317 A | 8/2008 |
| JP | 2008292743 A | 12/2008 |
| JP | 2010506982 A | 3/2010 |

(56)  References Cited

FOREIGN PATENT DOCUMENTS

| | | | |
|---|---|---|---|
| JP | 2013080242 | A | 5/2013 |
| KR | 20040097466 | A | 11/2004 |
| KR | 20050084086 | A | 8/2005 |
| KR | 1020060016469 | A | 2/2006 |
| KR | 100666961 | B1 | 1/2007 |
| KR | 1020070070675 | A | 7/2007 |
| KR | 1020070103069 | A | 10/2007 |
| KR | 20080046335 | A | 5/2008 |
| KR | 20080086245 | A | 9/2008 |
| KR | 1020090064588 | A | 6/2009 |
| MY | PI20071284 | | 2/2009 |
| TW | 200702904 | A | 1/2007 |
| TW | 200809287 | A | 2/2008 |
| TW | 200838901 | A | 10/2008 |
| TW | 201114716 | A | 5/2011 |
| WO | WO2004036270 | A1 | 4/2004 |
| WO | WO2005079129 | A1 | 8/2005 |
| WO | WO2011049564 | A1 | 4/2011 |
| WO | WO2012073929 | A1 | 6/2012 |
| WO | WO2014149502 | A1 | 9/2014 |
| WO | WO2022174006 | A1 | 8/2022 |

OTHER PUBLICATIONS

Cytec, Uvekol S UV Curable Glass Laminating System, May 4, 2006, 1 Page.

Schott, Glass Made of Ideas: Opalika, 2 Pages.

Pilkington Building Products, Pilkington OptiView Anti-Reflective Glass, 2005, 2 Pages.

T.M. Zeef, T.H. Hubing, J.L. Drewniak, R.E. Dussroff & T.P. Van Doren, EMC Analysis of an 18" LCD Monitor, Aug. 21, 25/2000, 1 Page.

3M Optical Systems, Immerse Yourself in Color, 2013, 4 Pages.

Wikipedia, Sol-gel, 2016, 12 Pages.

Panel-Brite, Inc., Aot (Advanced Optibond Technology), Mar. 11, 2009, 1 Page.

Dow Corning Corporation, Information About High Technology Silicone Materials, 1992, 4 Pages.

Dow Corning Corporation, Material Safety Data Sheet, Mar. 29, 2011, 8 Pages.

Pilkington Building & Speciality Glass Products, Pilkington TEC Glass For the Refrigeration Market, 2002, 2 Pages.

Mentley, David E., State of Flat-Panel Display Technology and Future Trends, Proceedings of the IEEE, Apr. 2002, vol. 90, No. 4, pp. 453-459.

* cited by examiner

DETAIL A

METHOD OF MANUFACTURING A DOOR FRAME SUBASSEMBLY FOR AN ELECTRONIC DISPLAY ASSEMBLY

CROSS-REFERENCE TO RELATED APPLICATIONS

This application claims the benefit of U.S. provisional patent application Ser. No. 63/541,567 filed Sep. 29, 2023, and U.S. provisional patent application Ser. No. 63/625,442 filed Jan. 26, 2024, the disclosures of each of which are hereby incorporated by reference as if fully restated herein.

TECHNICAL FIELD

Exemplary embodiments relate generally to extruded door frame subassemblies, such as for display assemblies, and related systems and methods.

BACKGROUND AND SUMMARY OF THE INVENTION

A variety of display assemblies, such as for digital out of home advertising or public announcements are known. These display assemblies often include electronic displays placed in ruggedized housings for indoor, outdoor, or semi-outdoor applications. These display assemblies may be mounted in a number of places and configurations, such as protruding from walls, poles, structural frames, or other objects. Certain of these display assemblies include a door frame subassembly, such as for housing the electronic display and/or providing an access panel to an interior thereof, such as for servicing. These door frame subassemblies are typically manufactured by cutting, bending, and/or welding multiple pieces together. When installed with the display assembly, the door frame subassembly may protrude, such as potentially with relatively sharp corners. What is needed is an extruded door frame subassembly.

An extruded door frame subassembly is provided, along with related systems and methods. The door frame subassembly may be formed by extruding a single piece of material, such as one or more metals. The extrusion may be subsequently bent, such as into a generally rectangular shape. Heat may be applied during the bending process to reduce material strength in the localized area, thereby permitting a tighter bend radius without, or with reduced, cracking and/or aesthetic defects. The resulting door frame subassembly may provide relatively rounded corners. Brackets may optionally be installed at the corners for connecting the door frame subassembly to a structural subassembly, wall, or the like. The brackets may provide additional strength at the corners. A recessed ledge may optionally be provided for interring a cover layer.

In exemplary embodiments, the extruded material may form a frame. The frame may comprise an outer perimeter surface, such as with spaced channels extending therealong and/or a recessed ledge extending inward therefrom, though the frame may comprise other shapes and/or features. Notches may be cut at the anticipated locations for corners, such as through the ledge and/or channels but not into the perimeter surface. These corner notches may each form a triangular shape, such as a substantially equilateral triangle. The frame may be bent at the corner notches, such as by a bending machine, such as while applying heat. The bottom portion of the frame may be secured by a bracket to itself.

Various display components, such as a cover, electronic display layer, touch sensitive layer, combinations thereof, or the like may be installed to the frame subassembly.

In exemplary embodiments, without limitation, heat may be applied to an outer portion of the frame where a bend is to be produced (e.g., where the corner notches are provided), such as by a heating source. The heated metal may be (prior to, during, and/or subsequently) positioned adjacent to a fixed surface and the heated, outer portion of the frame where a bend is to be produced (e.g., where the corner notches are provided) may be positioned against a bending die. The bending die may comprise, for example without limitation, a channel configured to accommodate the ledge of the frame 11. The bending die may, for example without limitation, be angled to substantially (e.g., within 20%) match the desired angle of bend. An end of the bending die proximate area to be bent (e.g., at one of the notches) may be rounded and/or comprise a thickness so as to form a rounded corner in the resulting frame at the bend. The bending die may be fixed, and the frame bent about the die, and/or the converse, such as manually, robotically, and/or in some other at least partially automated fashion (e.g., computer controlled). Heat may be applied to a temperature of about 300-650 degrees Fahrenheit for a period of time, such as between about 1 and 100 seconds, by way of non-limiting example. Higher temperatures may be utilized, such as for annealing. Such localized heating may temporarily soften and/or anneal the material, such as in preparation for bending. Heat may be applied by a flame (e.g., propane, natural gas, etc.) or other heat source (e.g., focused inductive electric heater, etc.). In exemplary embodiments, without limitation, the corners of the bent frame may have an outer radius of between about 0.01 to 0.5 inches nominally, preferably about (e.g., within 20% of) 0.25 inches nominally, though a wide variety of radii may be utilized. The frame material may comprise or consist of aluminum, such as 6063 T6 aluminum, by way of non-limiting example. The heating process and/or components shown and/or described herein may aid in bending without cracking, particularly when forming the rounded corners. The heating is optional and may be applied, or not applied for example, without limitation, based on the ductility of the material utilized.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
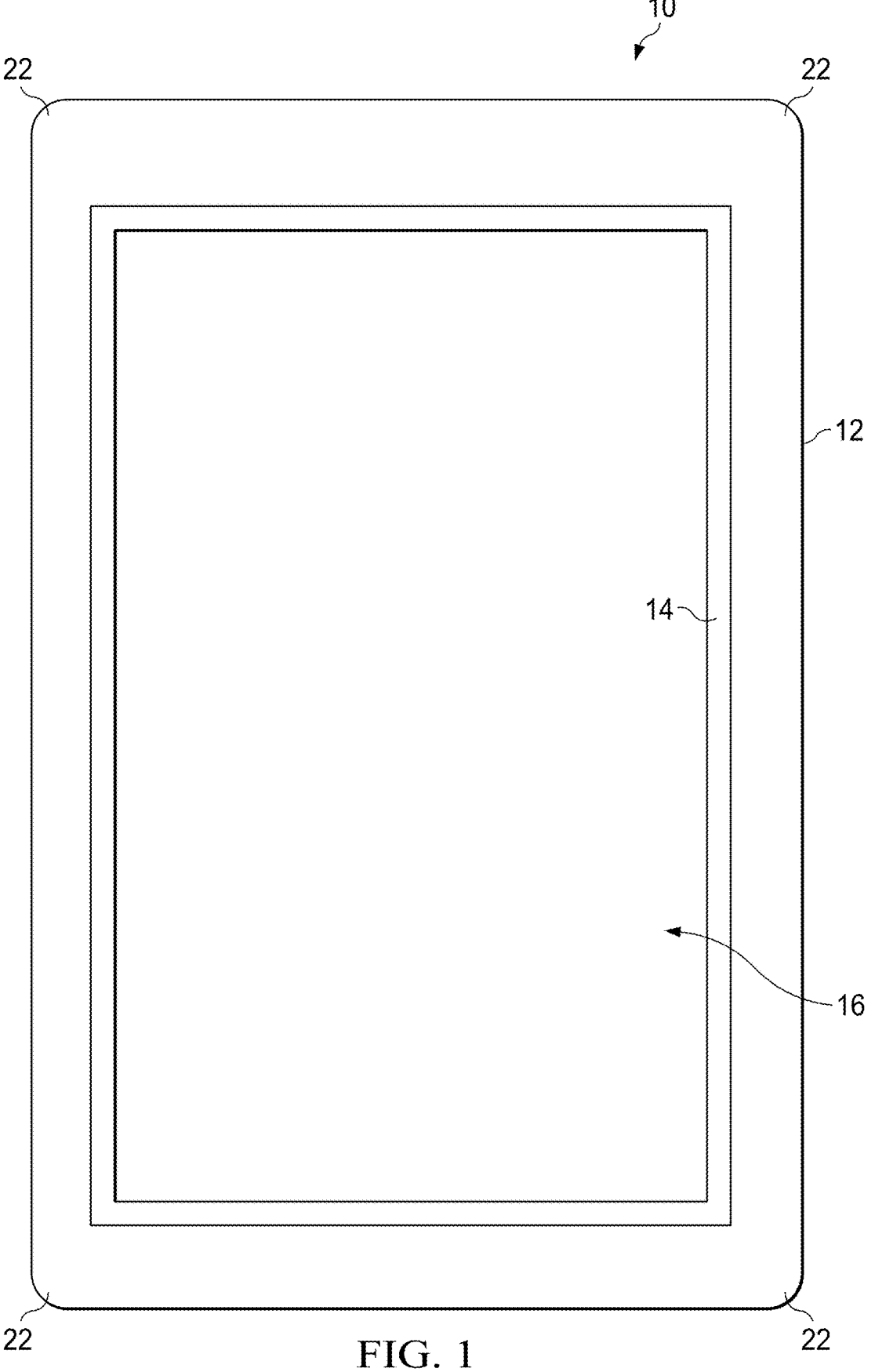
FIG. 1 is a front plan view of an exemplary door frame subassembly.
Figure 2:
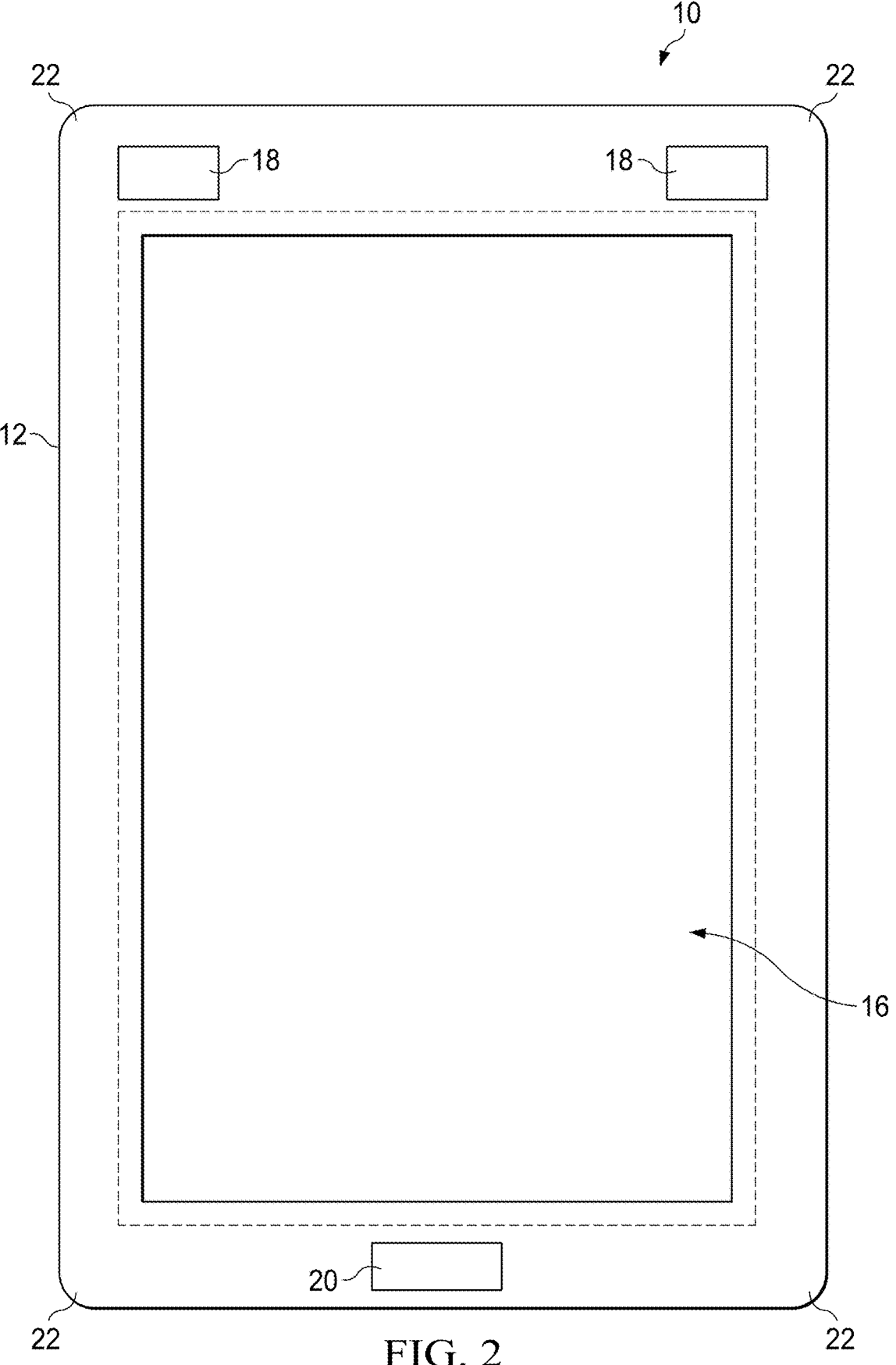
FIG. 2 is a rear plan view of the door frame subassembly of FIG. 1.

FIG. 1 and FIG. 2 illustrate an exemplary door frame subassembly 10. The door frame subassembly 10 may be part of an electronic display assembly, such as but not necessarily limited to, those available from Manufacturing Resources International, Inc. of Alpharetta, Georgia and/or shown and/or described in at least US Pub. No. 2022/0132681 published Apr. 28, 2022, the disclosures of which are hereby incorporated by reference as if fully restated herein.

The door frame subassembly 10 may comprise a frame 12. The frame 12 and/or subassembly 10 may define an opening 16, such as for viewing an electronic display located rearward thereof. A recessed ledge 14 may optionally be provided about some or all of a perimeter of the opening 16, such as to accommodate a cover layer, which may comprise glass, one or more polymers, and/or a partially or fully transparent material to protect the electronic display while also permitting viewing thereof. The cover layer or other component may optionally be adhered to the frame 12, such as at the recessed ledge 14. The frame 12 may comprise aluminum, such as but not limited to 6063T6 aluminum, and/or other material(s).

Brackets 18 may be installed at corners of the frame 12, preferably upper corners thereof, such as for attaching the door frame subassembly 10 to a structural subassembly, mounting devices installed at a wall or other surface, combinations thereof, or the like. The brackets 18 may comprise apertures for fasteners, surfaces for welding and/or adhesion, hooks (e.g., for mounting to corresponding hooks installed at a wall, structural subassembly, or other surface or object), posts (e.g., for connecting with hooks), hinge components (e.g., for connection with other hinge components), combinations thereof, or the like. Any number, type, and/or location of brackets may be provided. In exemplary embodiments, first and second brackets 18 are provided at interior, upper corners of the frame for added strength, installation, and/or to permit outward rotational movement of the door frame subassembly 10, such as for serving an interior of the display assembly. The door frame subassembly 10 and related components may be configured for rotation about a vertically extending axis or a horizontally extending axis, by way of non-limiting example. Alternatively, or additionally, the brackets 18 may be installed at various areas which provide structural strength to the completed assembly and/or the door frame subassembly 10. The brackets 18 may comprise stainless steel and/or other material(s).

A latch 20 may optionally be installed at a lower, interior surface of the frame 12 for connecting and securing the door frame subassembly 10 to a corresponding latching mechanism located at the wall, structural assembly, other surface and/or object. In other exemplary embodiments, one or more fasteners may be used instead of the latch 20. The frame 12 may comprise one or more metals, such as but not limited to 6063 T6 or other aluminum alloy.

Figure 3:
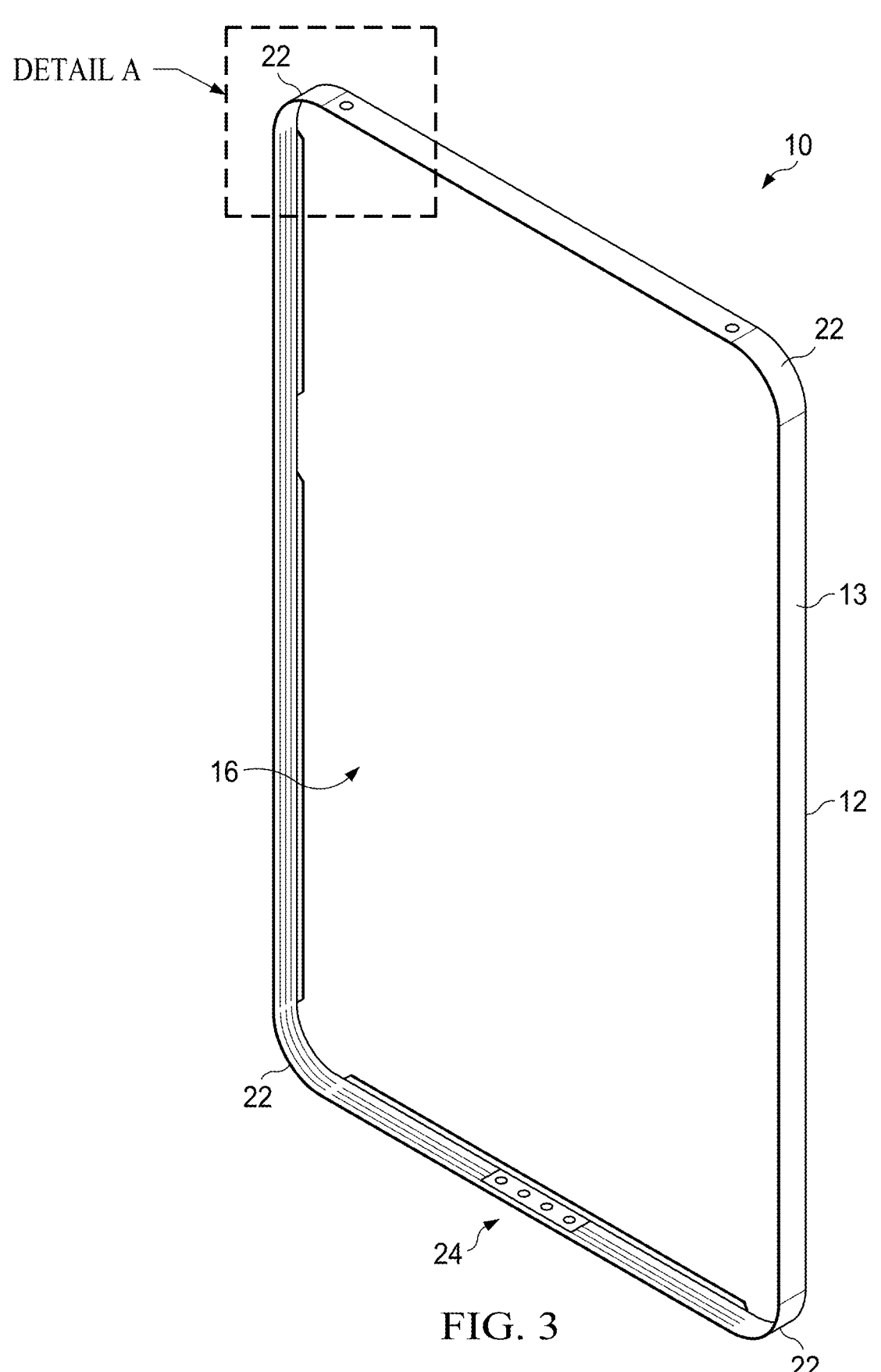
FIG. 3 is a perspective view of another exemplary door frame subassembly.

FIG. 3 illustrates another exemplary embodiment of the door frame subassembly 10. The door frame 12 may be bent at the corners 22, which may be rounded as a result. A bottom portion of the frame 12 may be secured by a bracket 24. Other locations and number of brackets 24 may be utilized. The bracket 24 may comprise a plate or other member through which fasteners are extended into the frame 12. Alternatively, or additionally, the bracket 24 may comprise a plate or other member which is welded or otherwise adhered to the frame 12. Alternatively, or additionally, to use of the brackets 24, the frame 12 may be joined by welding, adhesion, combinations thereof, or the like.

Figure 4:
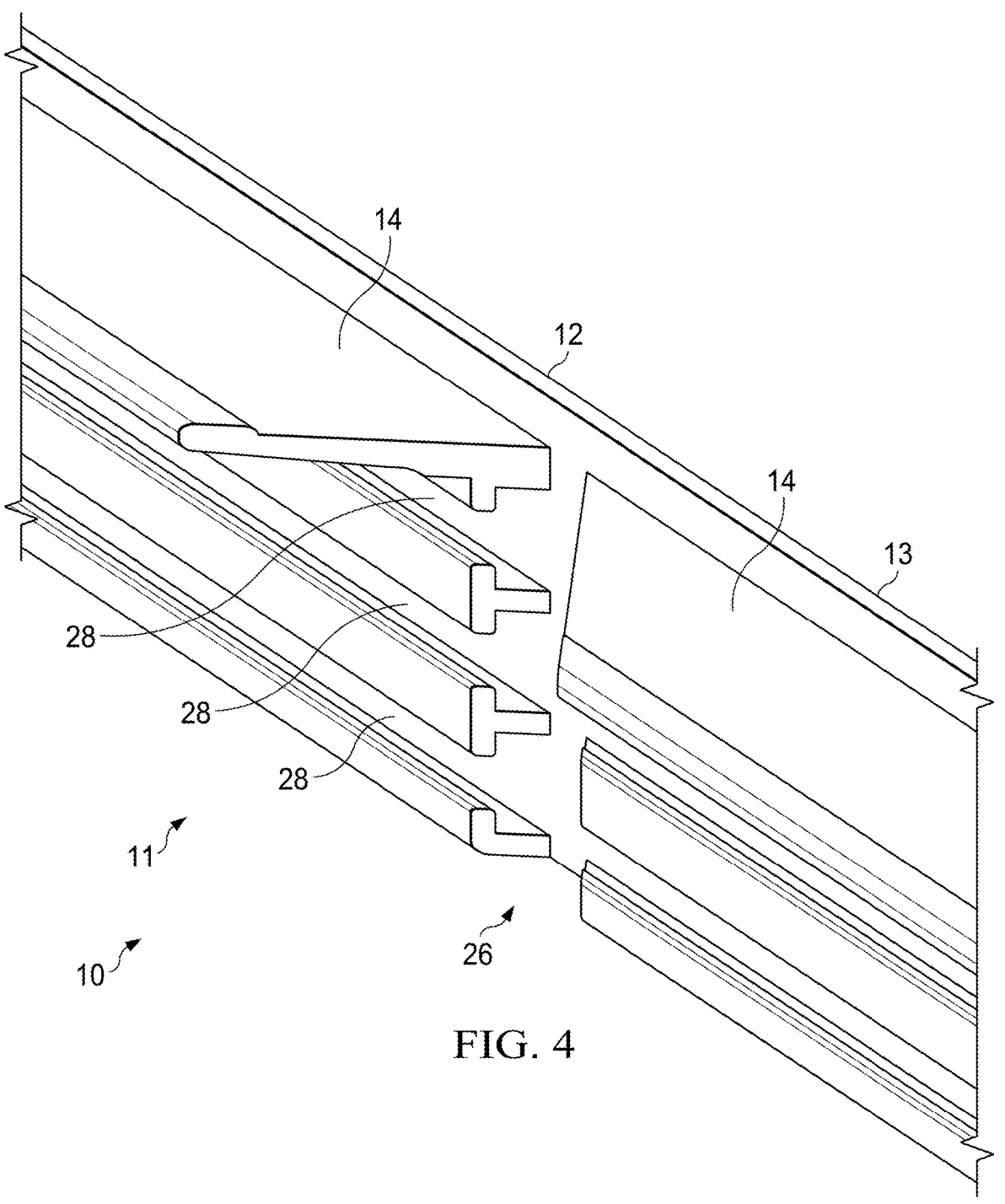
FIG. 4 is a detailed view of detail A of FIG. 3 with a component of the door frame subassembly before bending.

FIG. 4 illustrates a portion 11 of the frame 12 of the subassembly 10 before bending. The frame 12 may comprise a perimeter surface 13. The frame 12 in exemplary embodiments may comprise a recessed ledge 14, such as for a cover layer, electronic display, touch sensitive layer, or other object and/or display layer. The ledge 14 may extend substantially (e.g., within 10 degrees) perpendicular to the perimeter surface 13. In this way, the ledge 14 may extend inward from the perimeter surface 13, such as to at least partially define, frame, and/or enclose the opening 16. Channels 28 may be spaced apart and extend along the frame 12, preferably at interior facing portions of the perimeter surface 13. Other features may be provided at the frame 12. In exemplary embodiments, without limitation, the frame 12, including features thereof, may be formed by extrusion.

Corner notches 26 may be formed in the frame 12, such as by cutting. The corner notches 26 may be formed at the areas for generating the corners 22. The corner notches 26 may extend through the channels 28 and/or ledge 14 but not into and/or through the perimeter surface 13, for example. The corner notches 26 may form a generally triangular shape. For example, without limitation, a first edge of each notch 26 may extend at about 50-70 degrees from an interior portion of the perimeter surface 13 of the frame 12. A second edge may extend at an angle between 50-110 degrees from the first edge, thereby forming a substantially (e.g., within about 20 degrees) 90-degree notch 26, thereby also forming an empty, substantially equilateral triangular shape. However, other size and/or shape notches may be formed, such as at different angles to the perimeter surface 13 or other features to form various size and/or shape subassemblies 10. A generally rectangular shaped subassembly 10 being a preferred, but non-limiting, embodiment.

Figure 5:
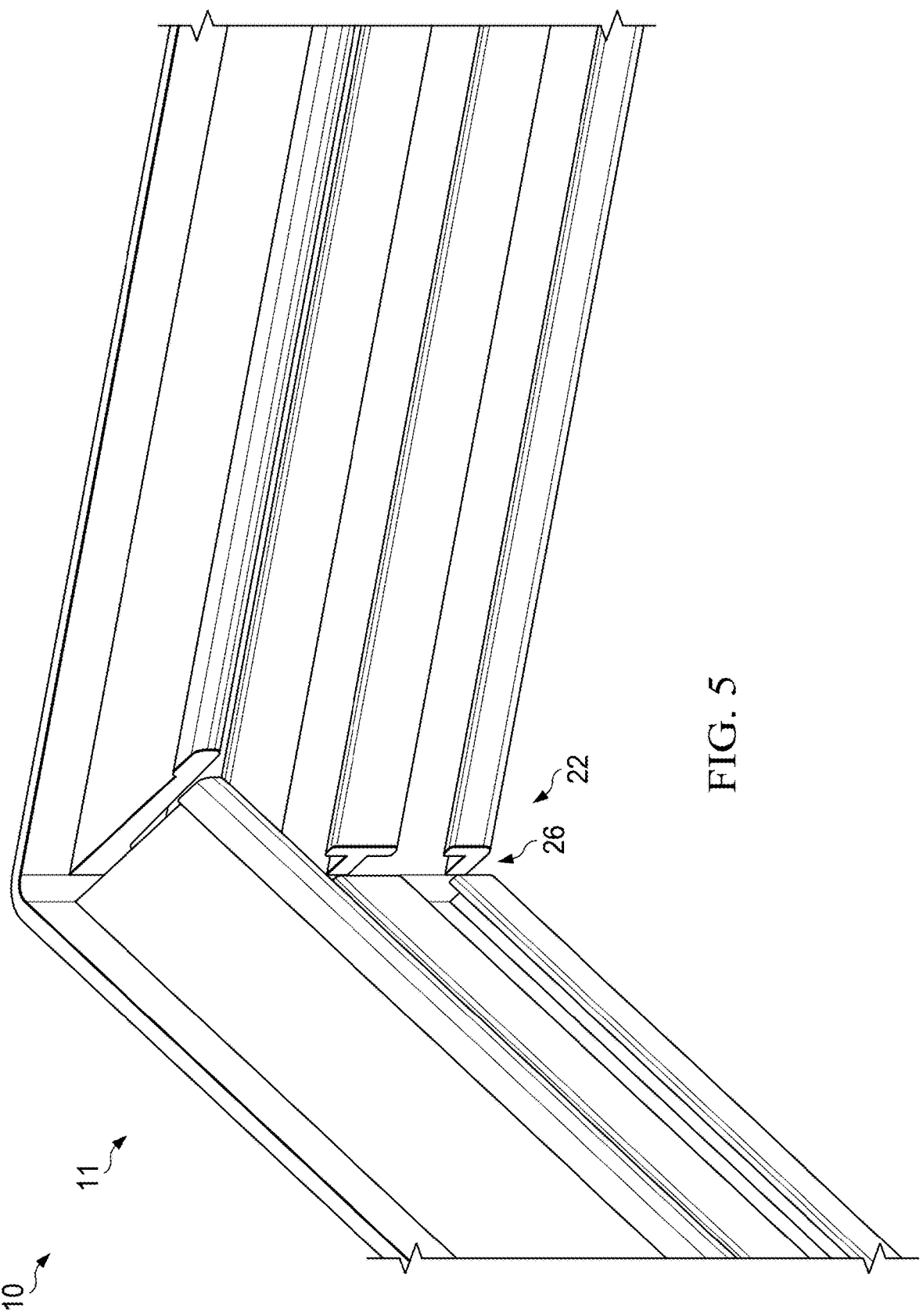
FIG. 5 is the detailed view of FIG. 4 with the door frame component after exemplary bending.

FIG. 5 illustrates the portion 11 of the frame 12 of the subassembly 10 bent to form an exemplary one of the corners 22. The corner notches 26 may be fully or substantially closed, such that interior components of the frame 12 touch, though such is not required. A small gap may remain between such components, such as ½ inch or less in size by way of non-limiting example. Alternatively, or additionally, the gap may be defined by an angular relationship between adjacent portions of the ledge 14 on either side of the closed notch 26 of not more than 15 degrees, by way of non-limiting example.

Figure 6:
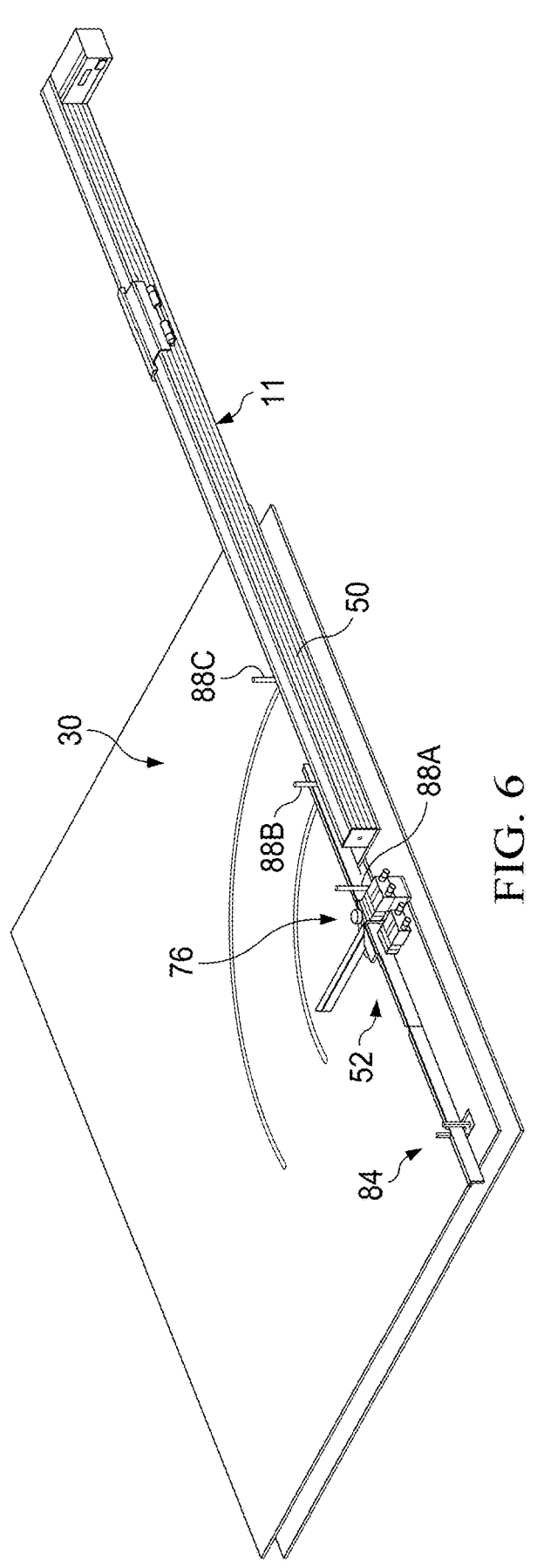
FIG. 6 is a perspective view of the door frame component undergoing bending at an exemplary bending machine.

FIG. 6 illustrates the portion 11 of the frame 12 of the subassembly 10 installed at an exemplary bending machine 30 for bending the portion 11 of the frame 12 to generate the corner 22. The portion 11 may be placed in the machine, such as at one or more clamps or holders. One of the corner notches 26 may be aligned with a bending point and the portion 11 is forced about the bending point, such as manually and/or automatically (e.g., by one or more robots, motorized items of equipment, pneumatics, combinations thereof, or the like). In this way, the rounded corners 22 may be formed.

The bending machine 30 may include one or more heating elements 84, such as heating coils. The heating element(s) 84 may be arranged to provide heating to the frame 11, such as pre-bending. The bending machine 30 may include one or more bending dies 52 for bending the frame 11 against. The bending machine 30 may include one or more rollers 76, such as for controlling frame 11 shape and/or facilitating bending. The roller(s) 76 may be controlled or otherwise configured for movement in an arc during bending, such as to maintain pressure on the corners being formed. In exemplary embodiments, without limitation, the roller(s) 76 are fixed to the bending arm 70 such that they rotate therewith, such as to provide the arc shaped motion. This also keeps the roller(s) 76 in contact with the corner 22 during formation.

The bending machine 30 may include one or more fixed surfaces 50, such as for placing the frame 11 against during bending. One or more sweeping pins 88 may be provided. In exemplary embodiments, without limitation, a series of three sweeping pins 88A, 88B, and 88C are provided, which are spaced apart from one another along and/or in line with a longitudinal axis of the fixed surface 50.

Figure 7:
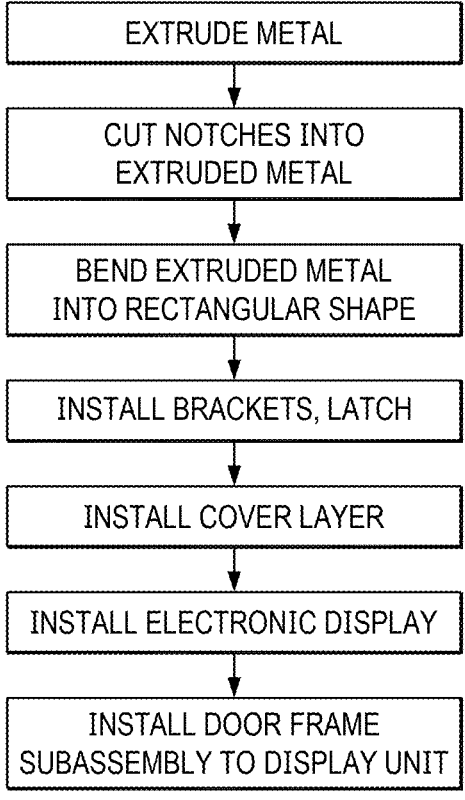
FIG. 7 is a flow chart with an exemplary manufacturing process for the door frame subassembly of FIGS. 1-5, such as with the bending machine of FIG. 6.

FIG. 7 illustrates an exemplary method for manufacturing the door frame subassembly 10. The frame 12 may be extruded, such as with or without the optional ledge 14. Corner notches 26 may be cut into the frame 12 at the anticipated areas of the corners 22. Cutting may be formed by saws, water jets, lasers, drills, combinations thereof, or the like. Cutting may be manual or automated, such as by way of one or more robots and/or computer-controlled machines.

The frame 12 may be bent to form a generally rectangular shape and define the opening 16. In exemplary embodiments, such bending is accomplished by installing the portion 11 of the frame 12 at the bending machine 30 and bending the portion 11 to form the corners 22 and/or close the corner notches 26, at least partially. Heat may be applied during the bending process, such as by torch. Placement, securement, bending and/or heating may be performed manually and/or at least partially automatically, such as by way of one or more robots and/or computer-controlled machines. Other portions 11 of the frame 12 may be bent accordingly. A bottom or other portion of the frame 12 with a resulting, small gap from the bending may be joined by one of the brackets 18, the latch 20, the bracket 24, and/or welding, bonding, another bracket, fastener, combinations thereof, or the like. Such installation and securement may be performed manually and/or at least partially automatically, such as by way of one or more robots and/or computer-controlled machines.

The brackets 18, bracket 24, and/or latch 20 may optionally be installed. The cover layer or other component may optionally be installed, such as at the optional ledge 14. An electronic display may be installed to the door frame assembly 10, such as before or after the door frame subassembly 10 is installed to a structural subassembly, wall, or other object or surface. The resulting exterior corners 22 may be relatively rounded. The illustrated level of rounding is exaggerated for visibility, and regardless is intended to be merely exemplary and not limiting. Components, such as but not necessarily limited to the brackets 18, bracket 24, and/or latch 20 may be installed as each corner 22 is formed, or after all corners 22 are formed.

Figure 8:
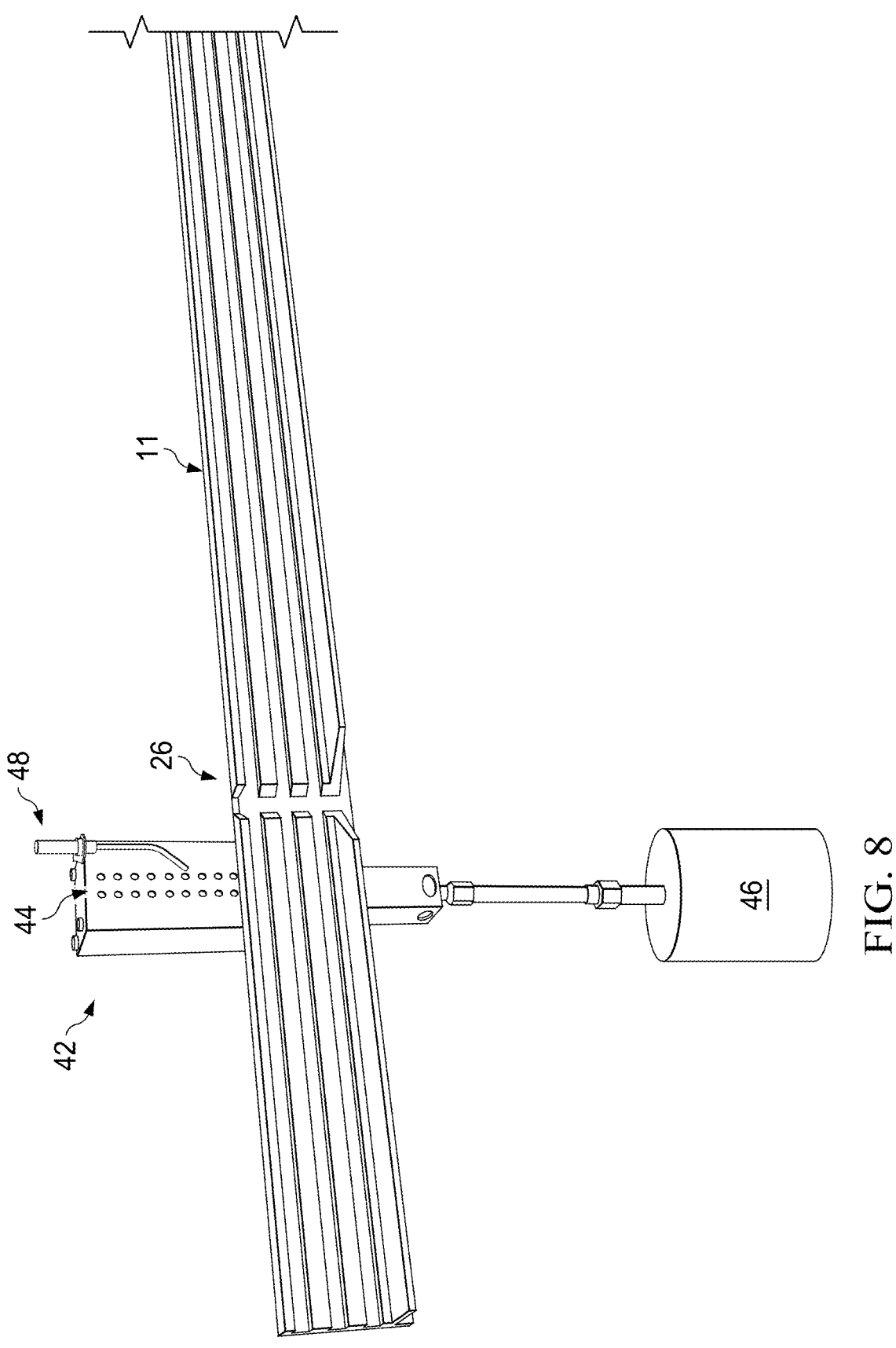
FIG. 8 is a perspective view of a portion of an exemplary manufacturing system for the process of FIG. 7 and/or bending machine of FIG. 6.
Figure 9:
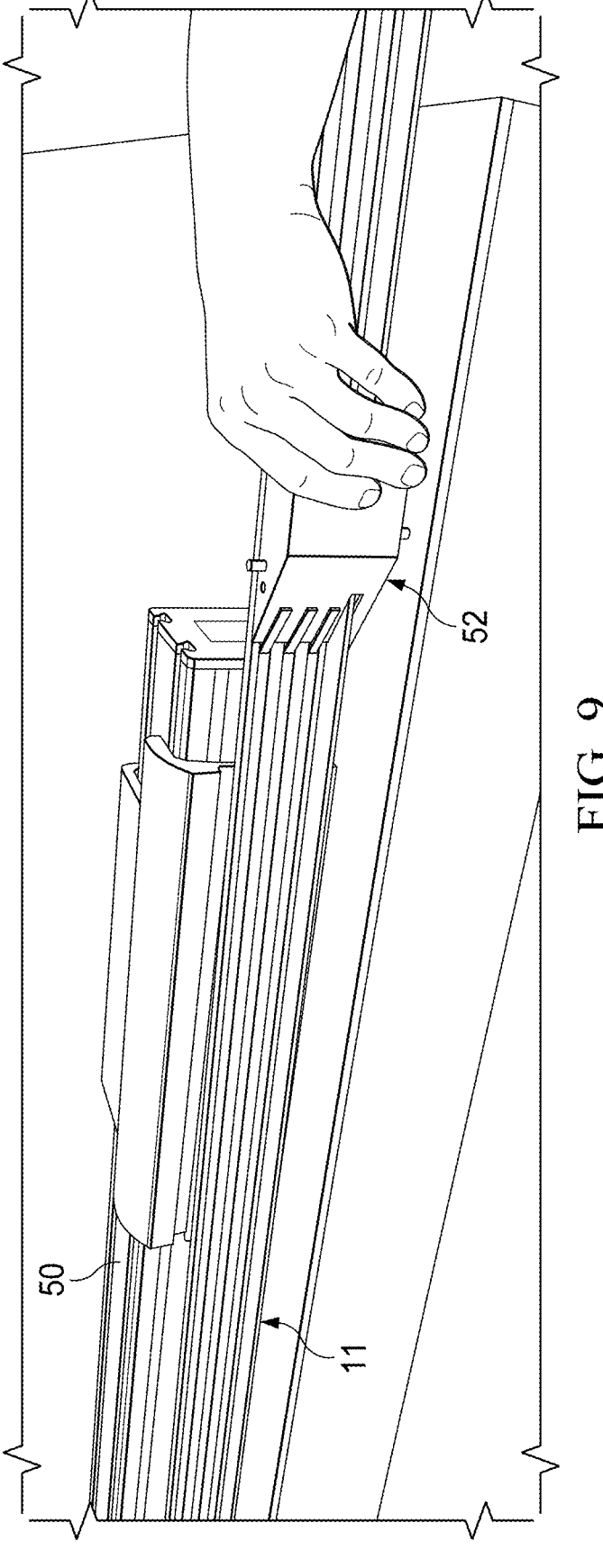
FIG. 9 is a perspective view of another portion of the manufacturing system of FIG. 8.
Figure 10:
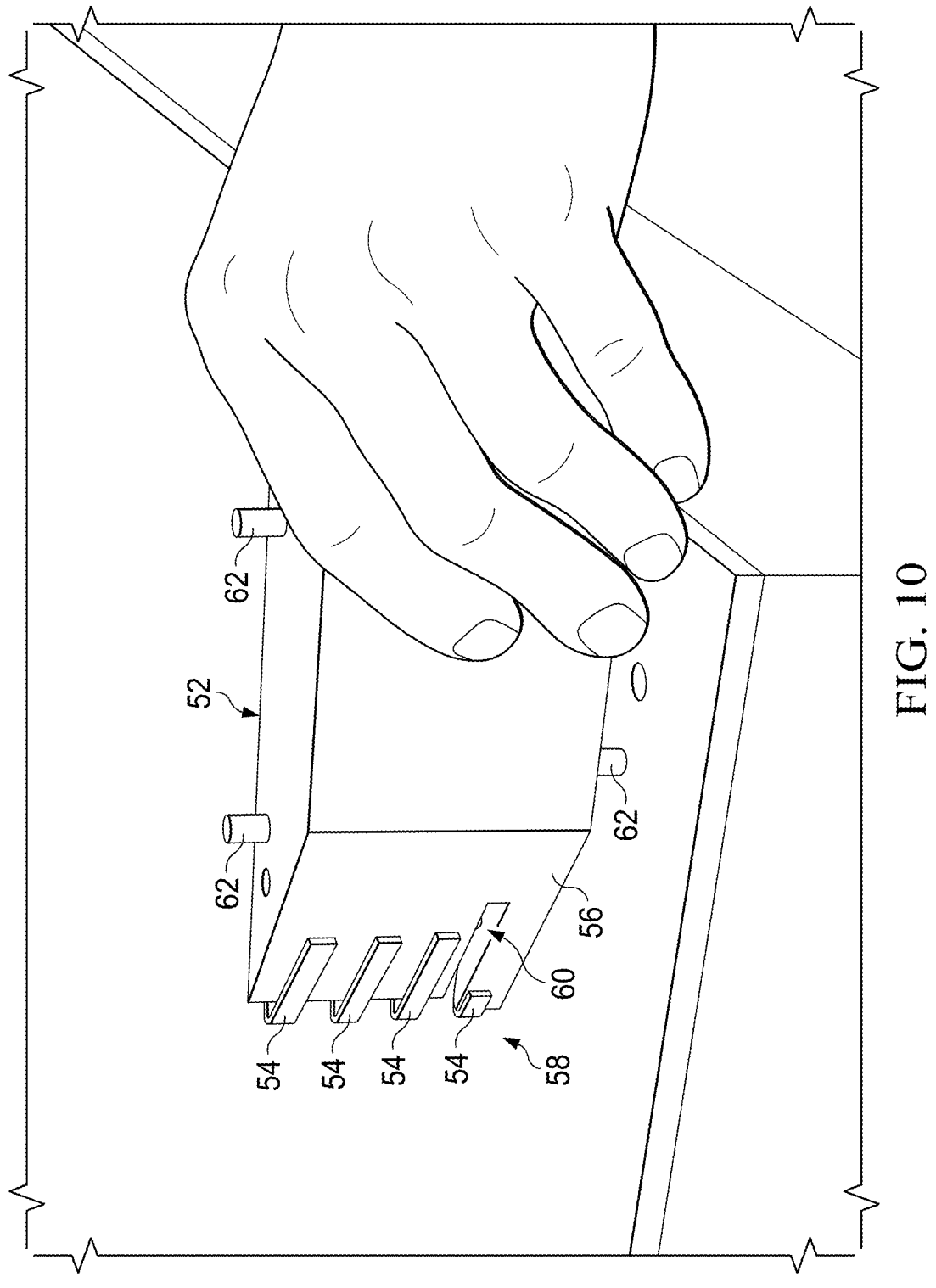
FIG. 10 is a detailed perspective view of an exemplary bending die for use with the process of FIG. 7, bending machine of FIG. 6, and/or system of FIGS. 8-9.

FIG. 8 through FIG. 10 illustrate additional exemplary components for use with some or all of the process of FIG. 7 and/or the bending machine 30 of FIG. 6. A heat source 42 may be provided. The heat source 42 may comprise a number of openings 44. Any number and/or arrangement of openings 44 may be utilized. The heat source 42 may be connected to a fuel source 46, such as but not limited to a propane tank, such as by way of one or more pipes, lines, etc. An ignition source 48 may be positioned near the openings 44.

Any type or kind of heat source 42 may be utilized. For example, without limitation, the heat source 42 may be configured to provide a flame (e.g., propane, natural gas, etc.) and/or provide flameless heat (e.g., focused inductive electric heater, etc.).

In exemplary embodiments, without limitation, the corners 22 of the bent frame 11 may have an outer radius of between about 0.01 to 0.5 inches nominally, preferably about (e.g., within 20% of) 0.25 inches nominally, though a wide variety of radii may be utilized.

In exemplary embodiments, without limitation, heat may be applied to an outer portion of the frame 11 where a bend is to be produced (e.g., where the corner notches 26 are located). The heated frame 11 may be (prior to, during, or subsequently) positioned adjacent to a fixed surface 50 and the heated, outer portion of the frame 11 where a bend is to be produced (e.g., where the corner notches 26 are located) may be positioned against a bending die 52. The fixed surface 50 may comprise a member or wall fixed to a table or other surface, for example. The frame 11 may be bent about the die 52, and/or the converse, such as manually, robotically, and/or in some other at least partially automated fashion (e.g., computer controlled).

The bending die 52 may comprise a recess 60 which accommodates the ledge 14 of the frame 11 during bending.

The bending die 52 may comprise an angled surface 56 which at least substantially (e.g., within 20%) matches the desired angle of bend in the frame. Preferably, an end 58 of the bending die 52 proximate area to be bent (e.g., at one of the notches 26) may be rounded and/or comprise a thickness so as to form a rounded corner in the resulting frame 11 at the bend.

In exemplary embodiments, without limitation, the bending die 52 comprises protrusions 54. The protrusions 54 may comprise strips of metal which are elevated from, and at least a portion of which extends at least substantially (e.g., within 20%) parallel with the angled surface 56. The elevated nature of the protrusions 54 may provide some flexibility in bending the frame 11 and/or variability in bend radius. In exemplary embodiments, without limitation, the resulting bend radius may be between 0.01 and 0.5 inches at the outer diameter, more preferably about (e.g., within 20% of) 0.25 inches. The protrusions 54 may be configured to provide resistive force(s) to, and/or shape for, bending.

The protrusions 54 are optional. The bending die 52 may be provided without the protrusions 54 such that the end 58 provides approximately (e.g., within 20% of) the desired bending radius.

The bending die 52 may be fixed during use, such as at the table or other surface proximate the fixed surface 50. The bending die 52 may comprise one or more posts 62 to assist with such fixing. For example, without limitation, the posts 62 may be receivable within apertures at the table or other surface.

Heat may be applied by way of the heat source 42, such as to heat at least the adjacent portion of the frame 11 to a temperature of about 300-650 degrees Fahrenheit, such as for a period of time between about 1 and 100 seconds, by way of non-limiting example. Higher temperatures may be utilized, such as for annealing.

The frame 11 may comprise or consist of aluminum, such as 6063 T6 aluminum, by way of non-limiting example. The heating process and/or components shown and/or described herein may aid in bending without cracking, particularly when forming the rounded corners. Some or all of the components of FIGS. 7-8 may be used with the bending machine 30, though such is not necessarily required.

Certain features may be illustrated in exaggerated or otherwise disproportional form. For example, the corners 22 of at least FIGS. 1-3 may be illustrated in exaggerated form. Nominal outer radius for some or all of the corners 22 may be from about 0.01 to 0.5 inches, preferably about (e.g., within 20% of) 0.25 inches by way of non-limiting example.

FIG. 11 through FIG. 16 illustrate the door frame subassembly 10. The door frame subassembly 10 may be formed using some or all of the systems, methods, components, and/or steps shown and/or described herein. In exemplary embodiments, nominal outer radius for some or all of the corners 22 may be from about 0.01 to 0.5 inches, preferably about (e.g., within 20% of) 0.25 inches by way of non-limiting example.

Figure 11:
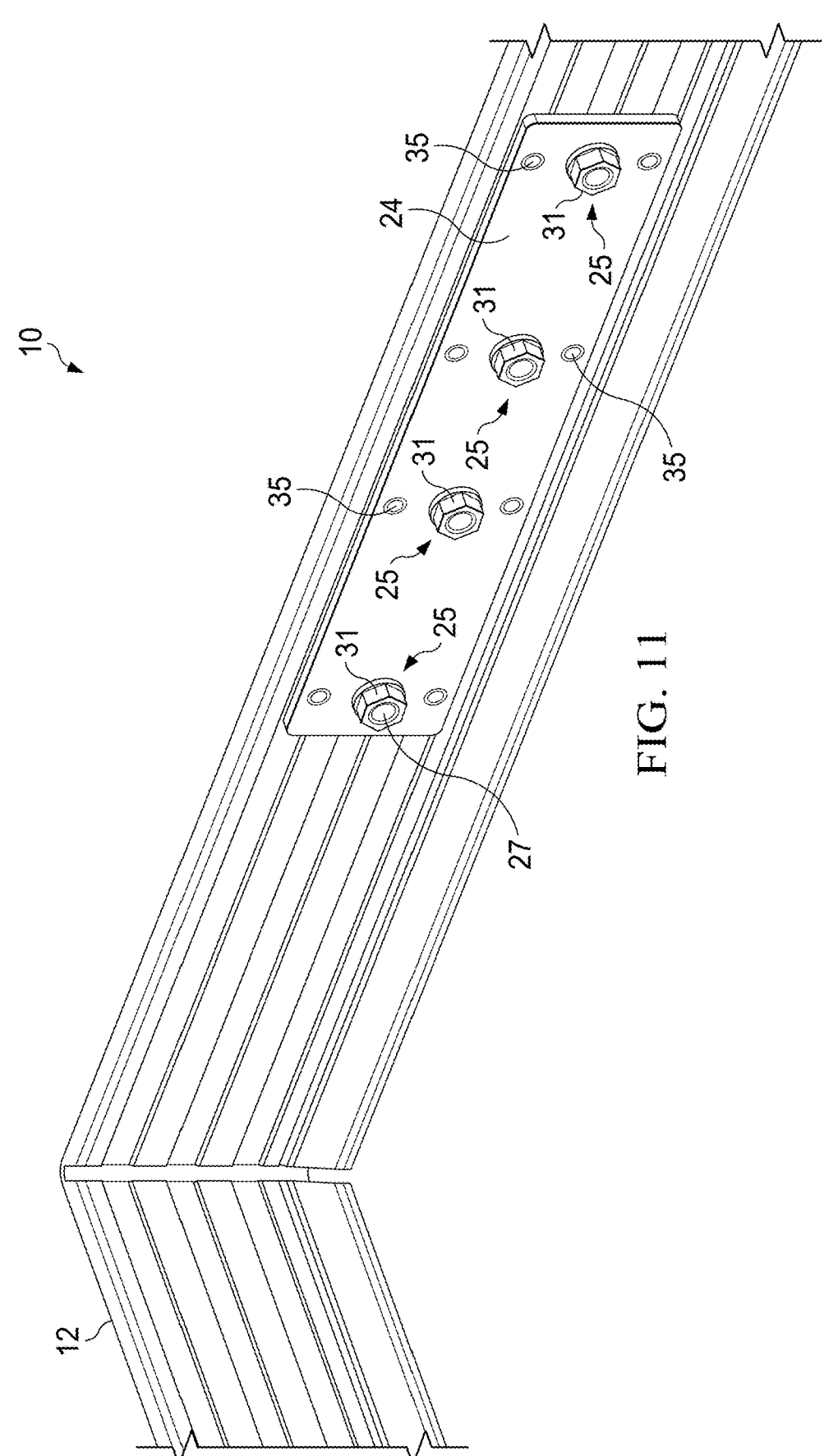
FIG. 11 is a detailed perspective view of another exemplary door frame subassembly.
Figure 12:
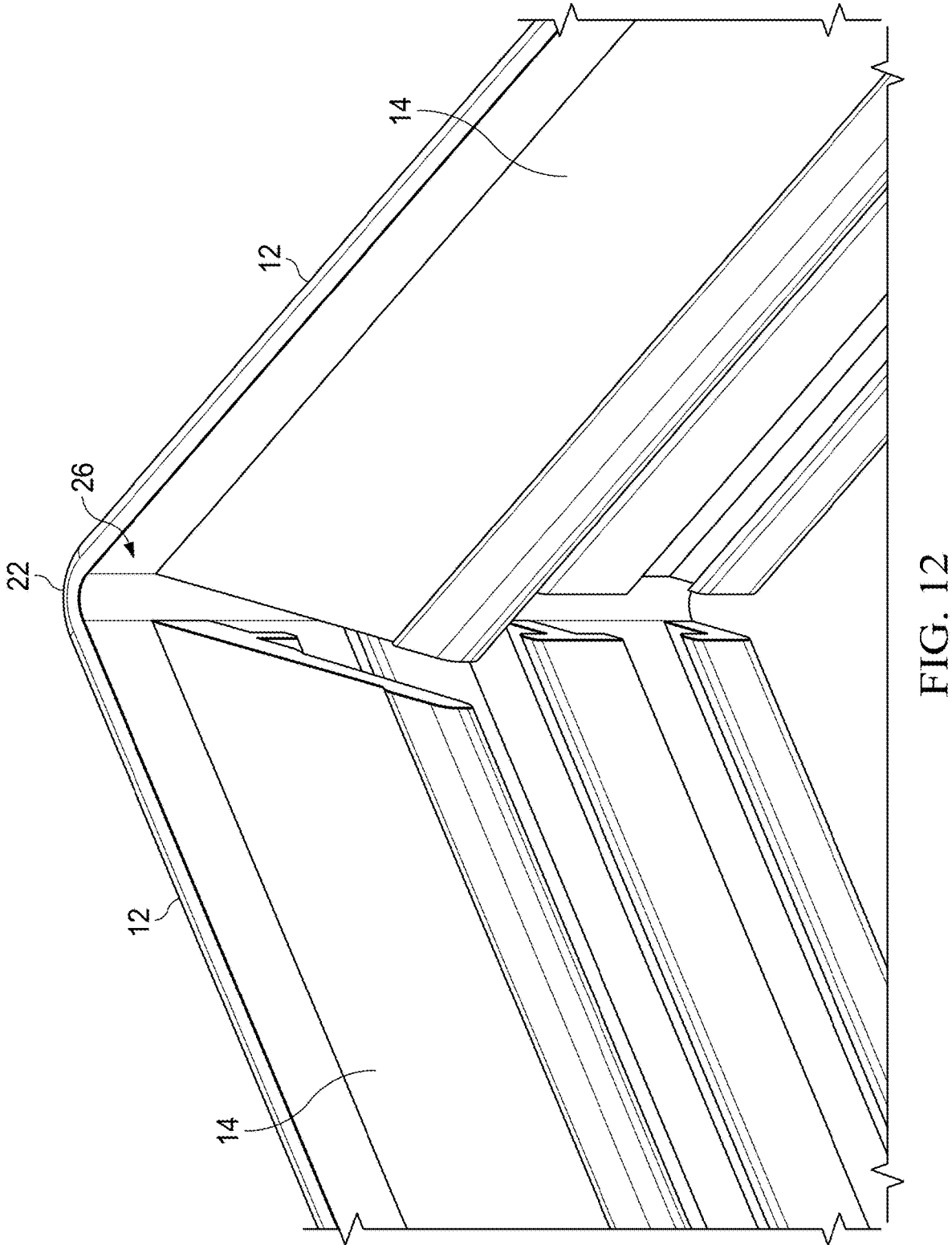
FIG. 12 is a detailed perspective view of a corner of the door frame assembly of FIG. 11.
Figure 13:
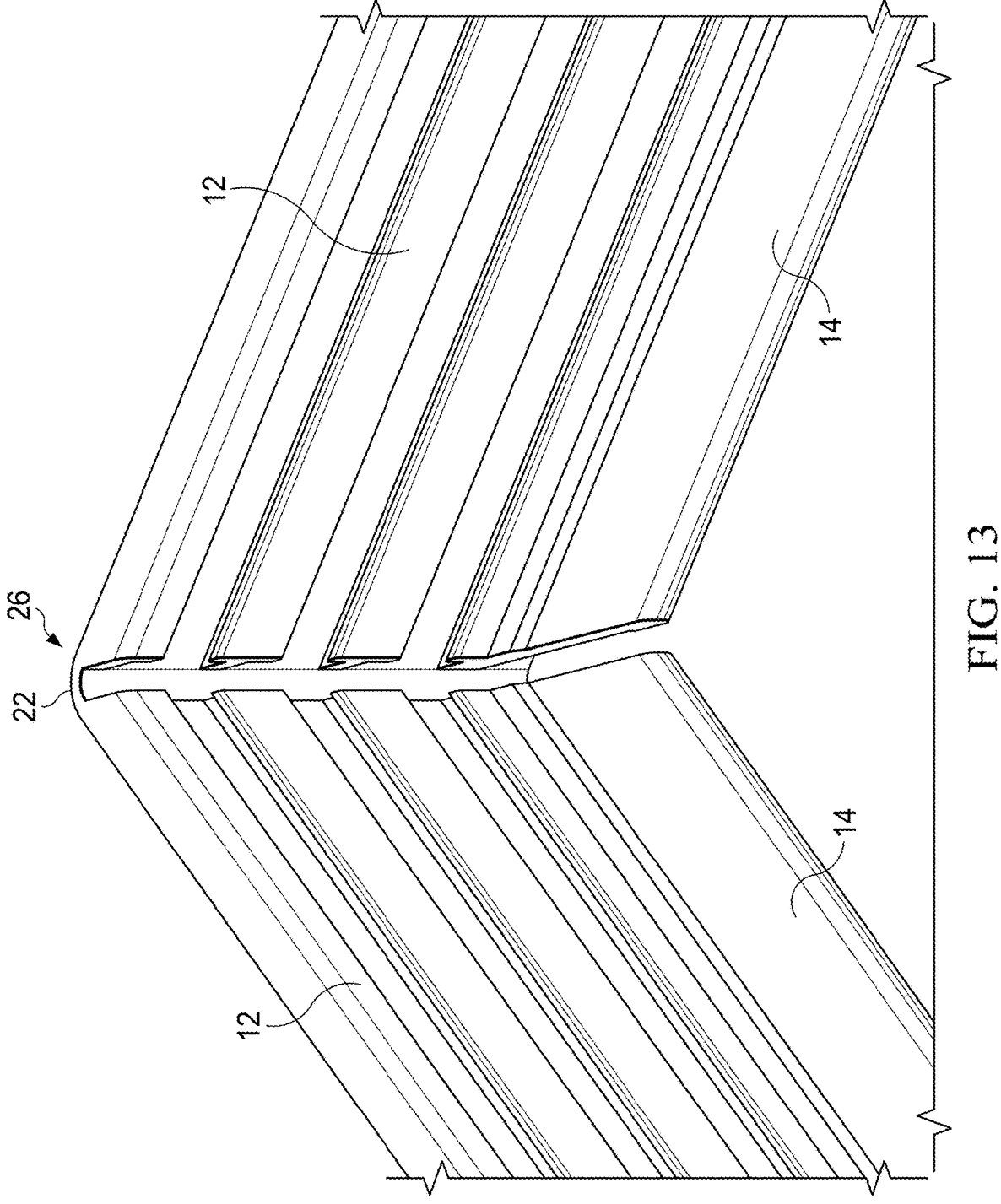
FIG. 13 is another detailed perspective view of the corner of the door frame assembly of FIG. 11.
Figure 14:
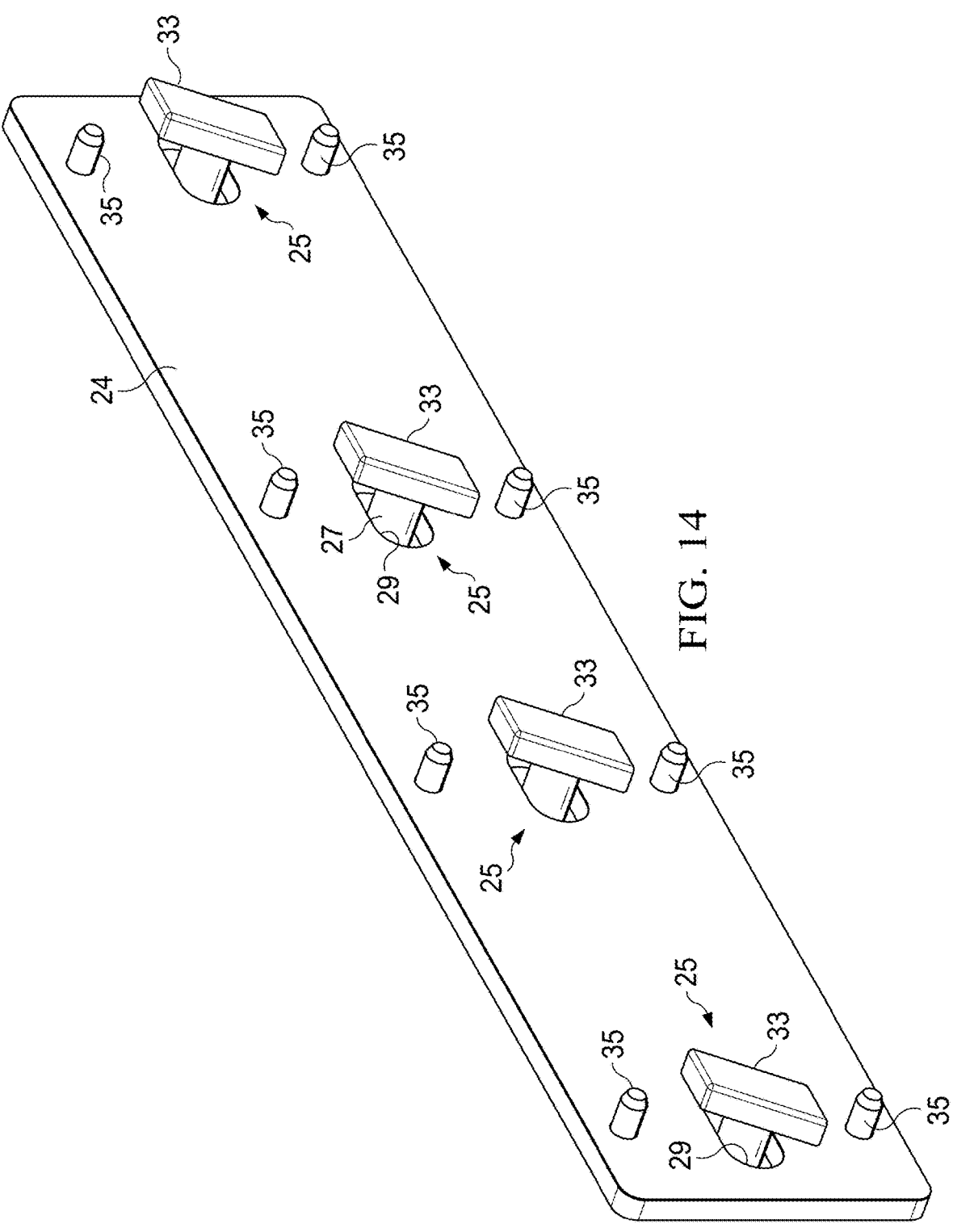
FIG. 14 is a detailed perspective view of a bracket of the door frame assembly of FIG. 11 illustrated without other certain components of the door frame assembly.
Figure 15:
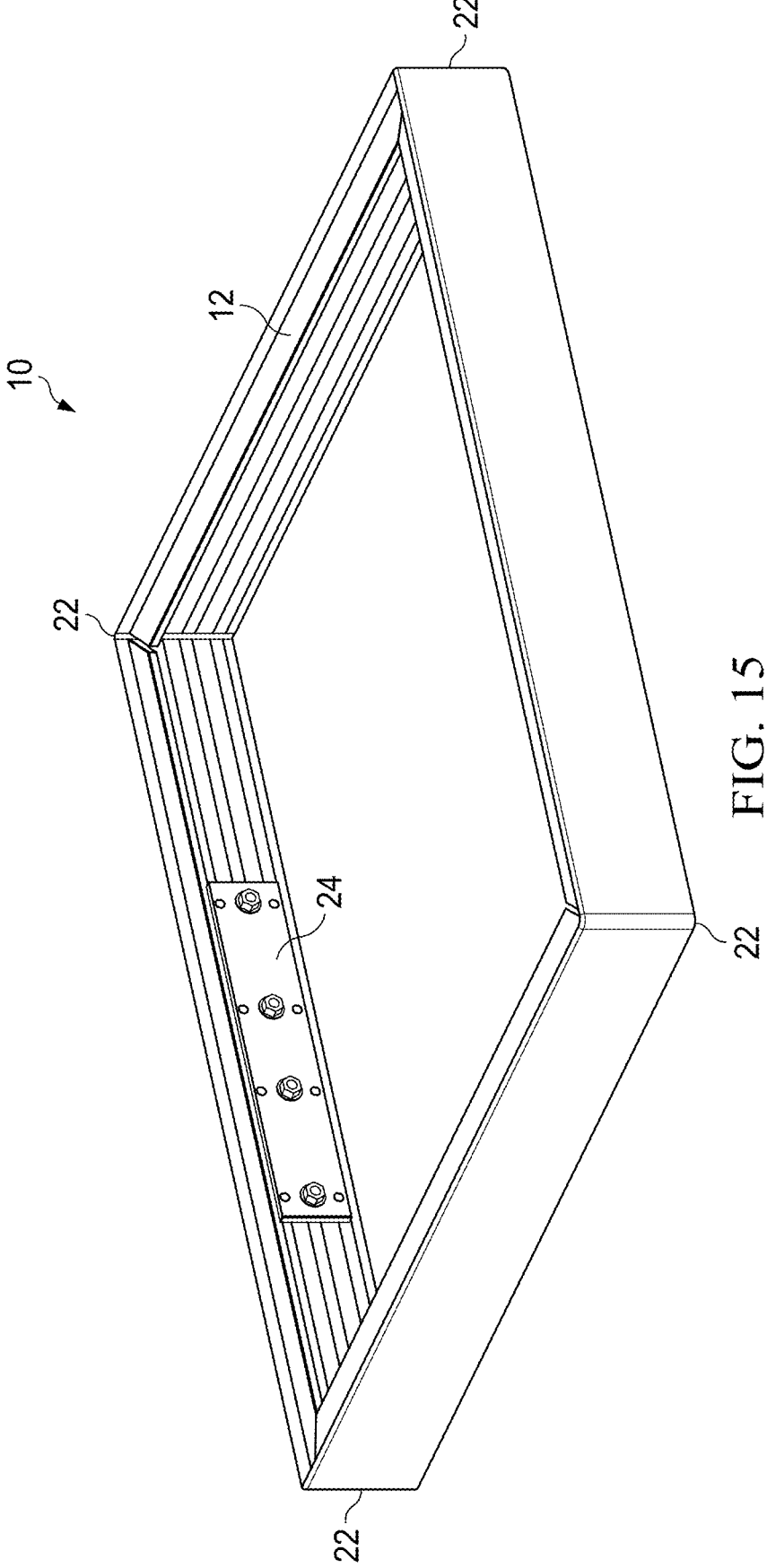
FIG. 15 is a detailed perspective view of the door frame assembly of FIG. 11.
Figure 16:
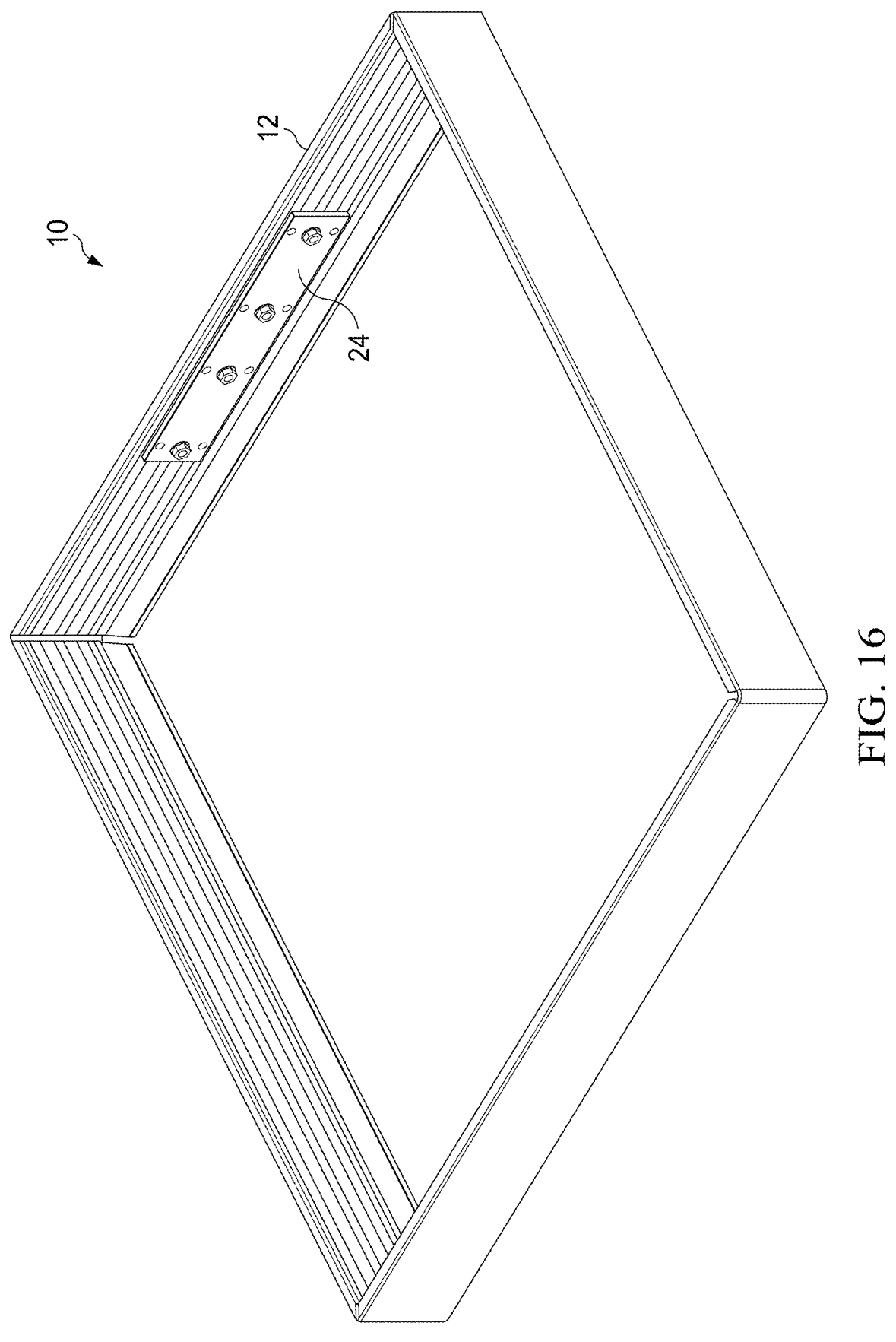
FIG. 16 is another perspective view of the door frame assembly of FIG. 15.
Figure 17:
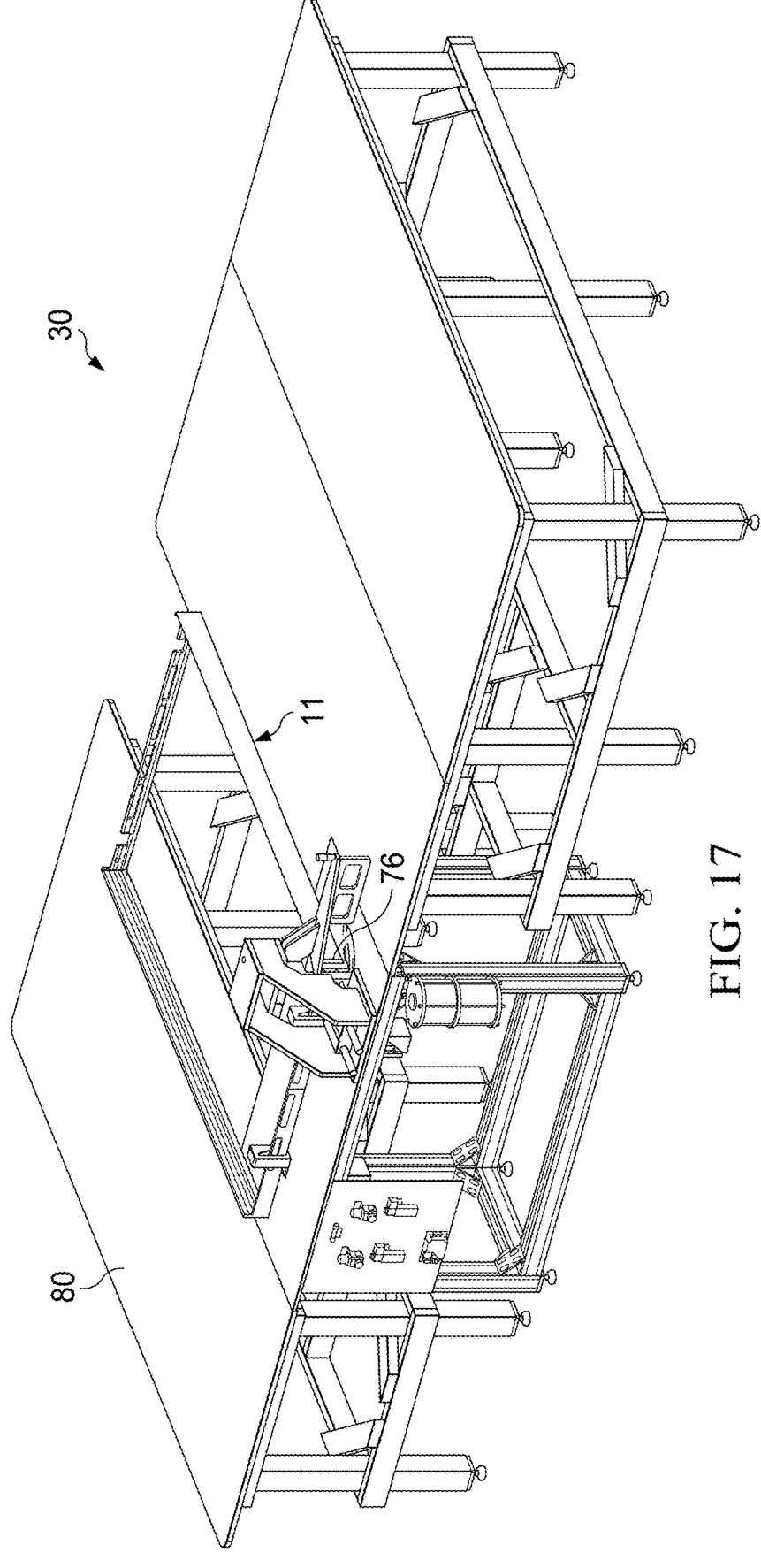
FIG. 17 is a perspective view of another exemplary embodiment of the bending machine for the use with the process of FIG. 7.
Figure 18:
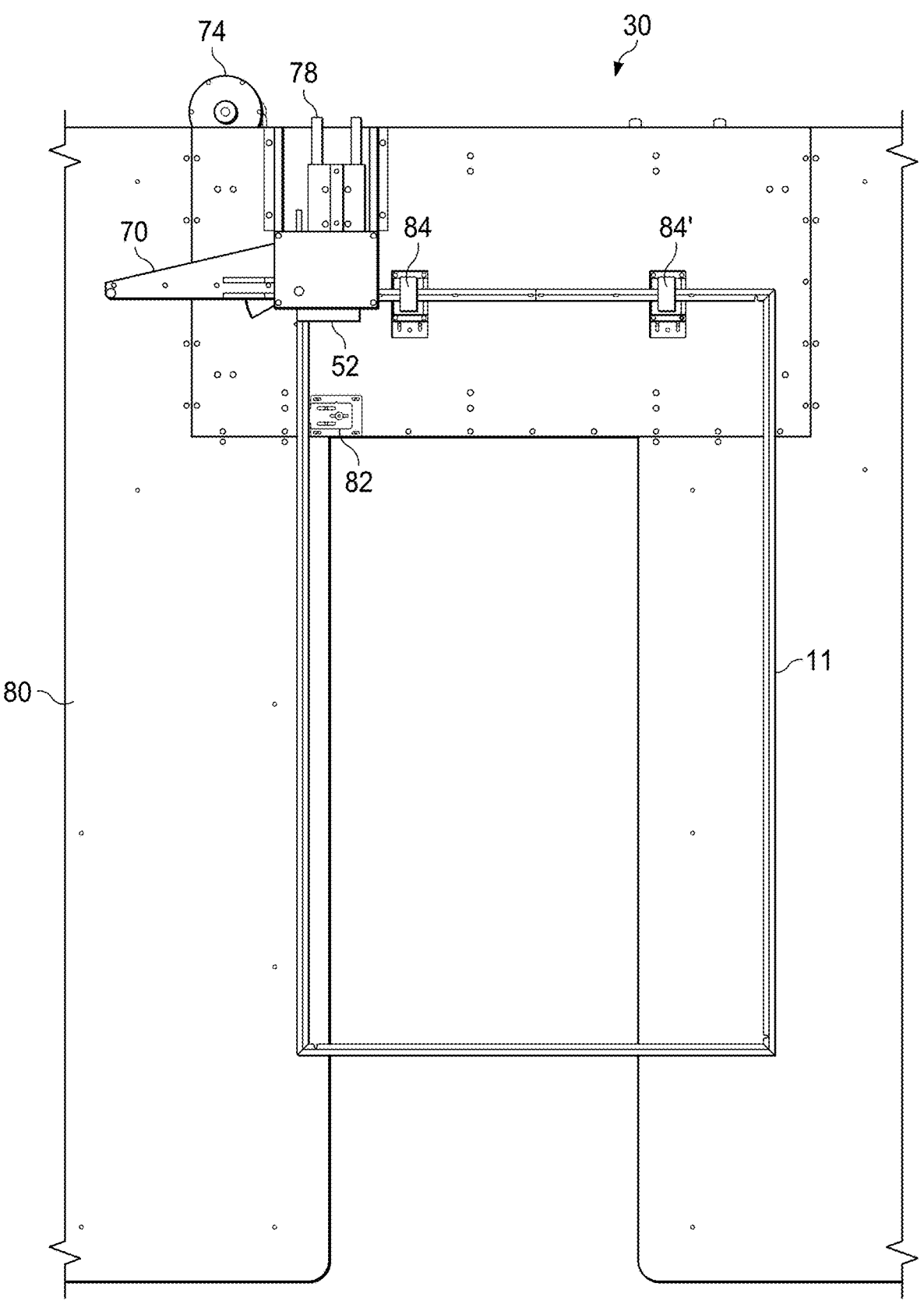
FIG. 18 is a top view of the bending machine of FIG. 17.
Figure 19:
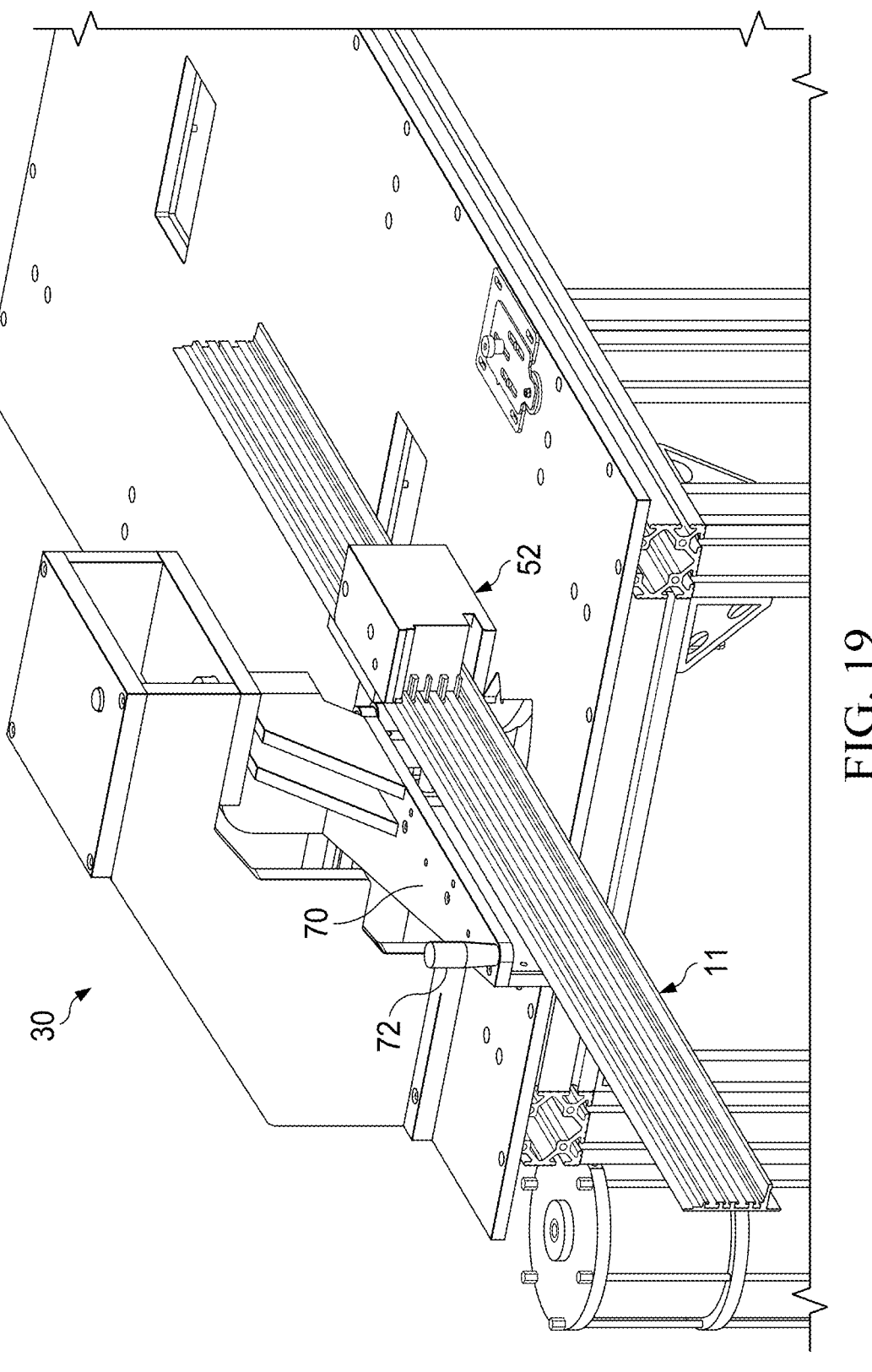
FIG. 19 is a perspective view of a portion of the bending machine of FIG. 17 in exemplary use.
Figure 20:
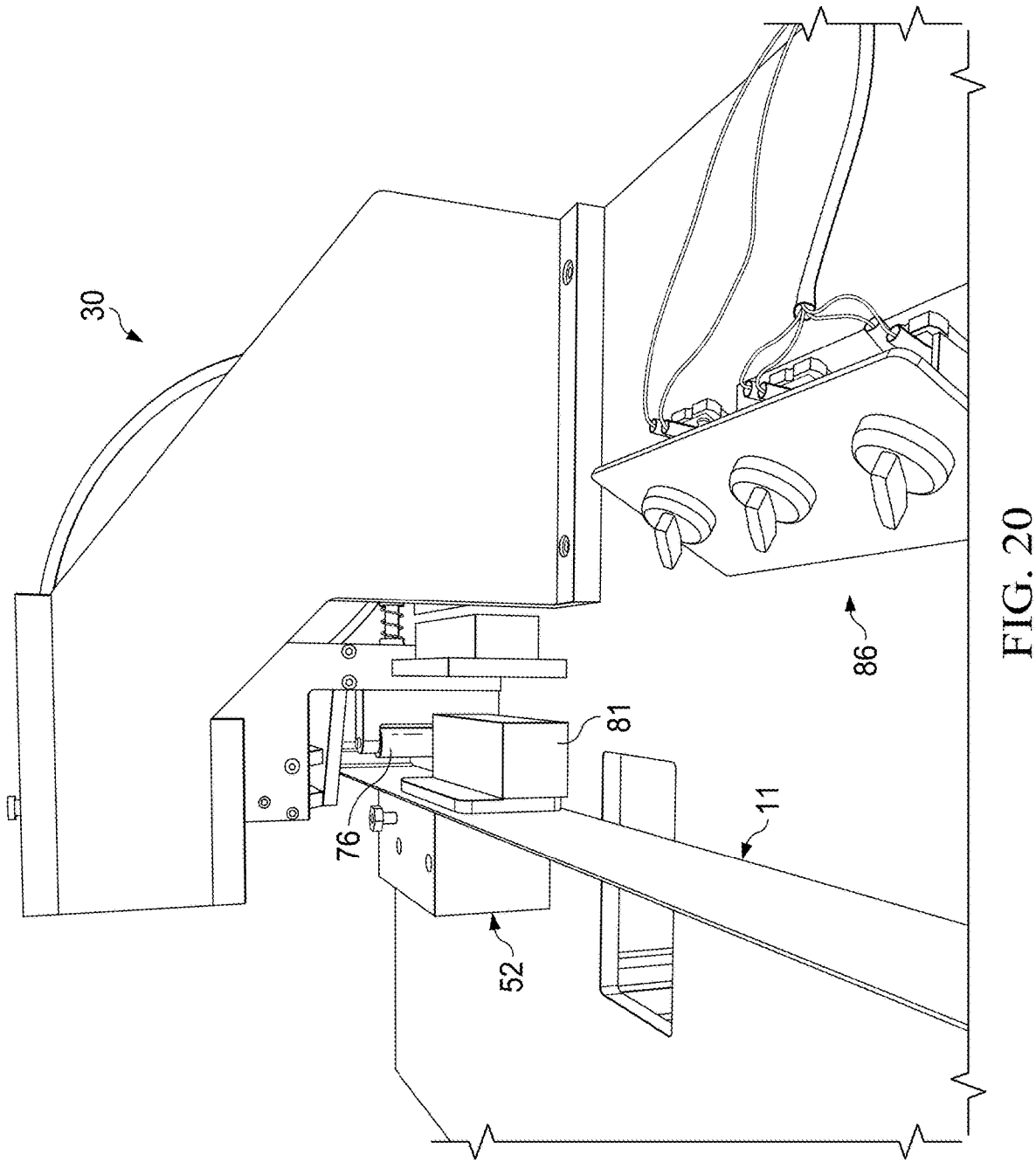
FIG. 20 is a right side view of the portion of the manufacturing system of FIG. 19.
Figure 21:
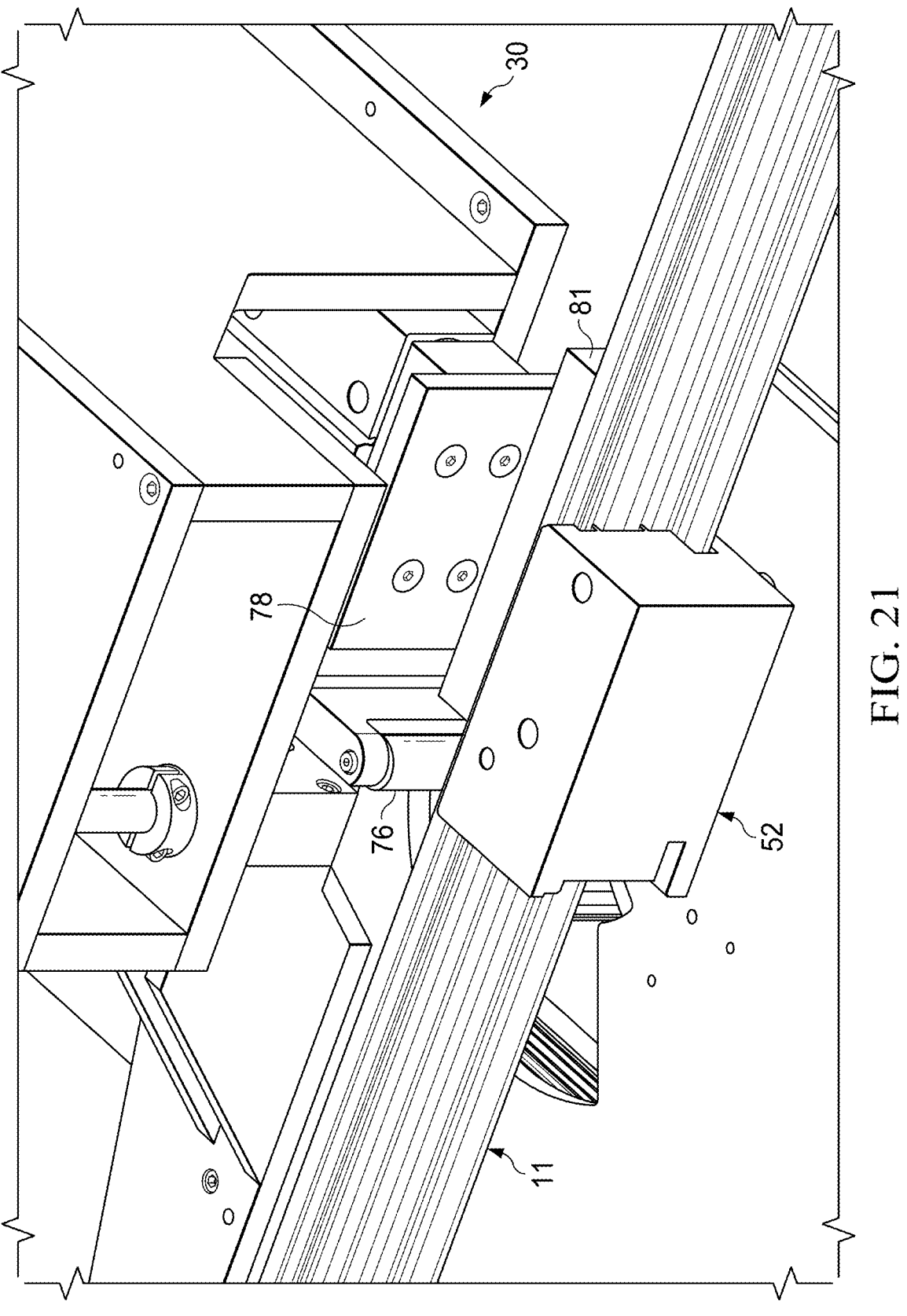
FIG. 21 is a detailed perspective view of the portion of the manufacturing system of FIG. 19.
Figure 22:
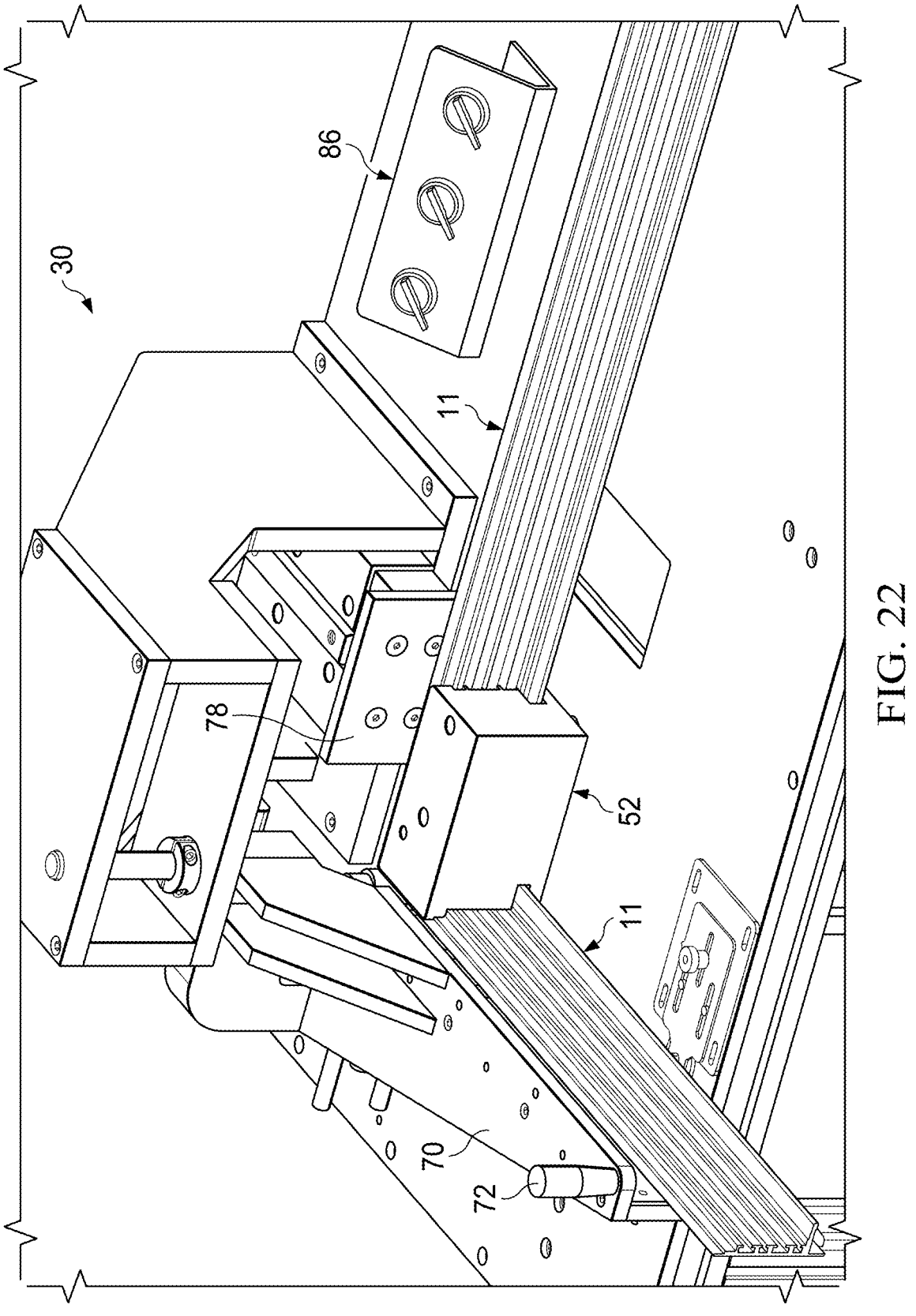
FIG. 22 is a perspective view of the portion of the manufacturing system of FIG. 19.
Figure 23A:
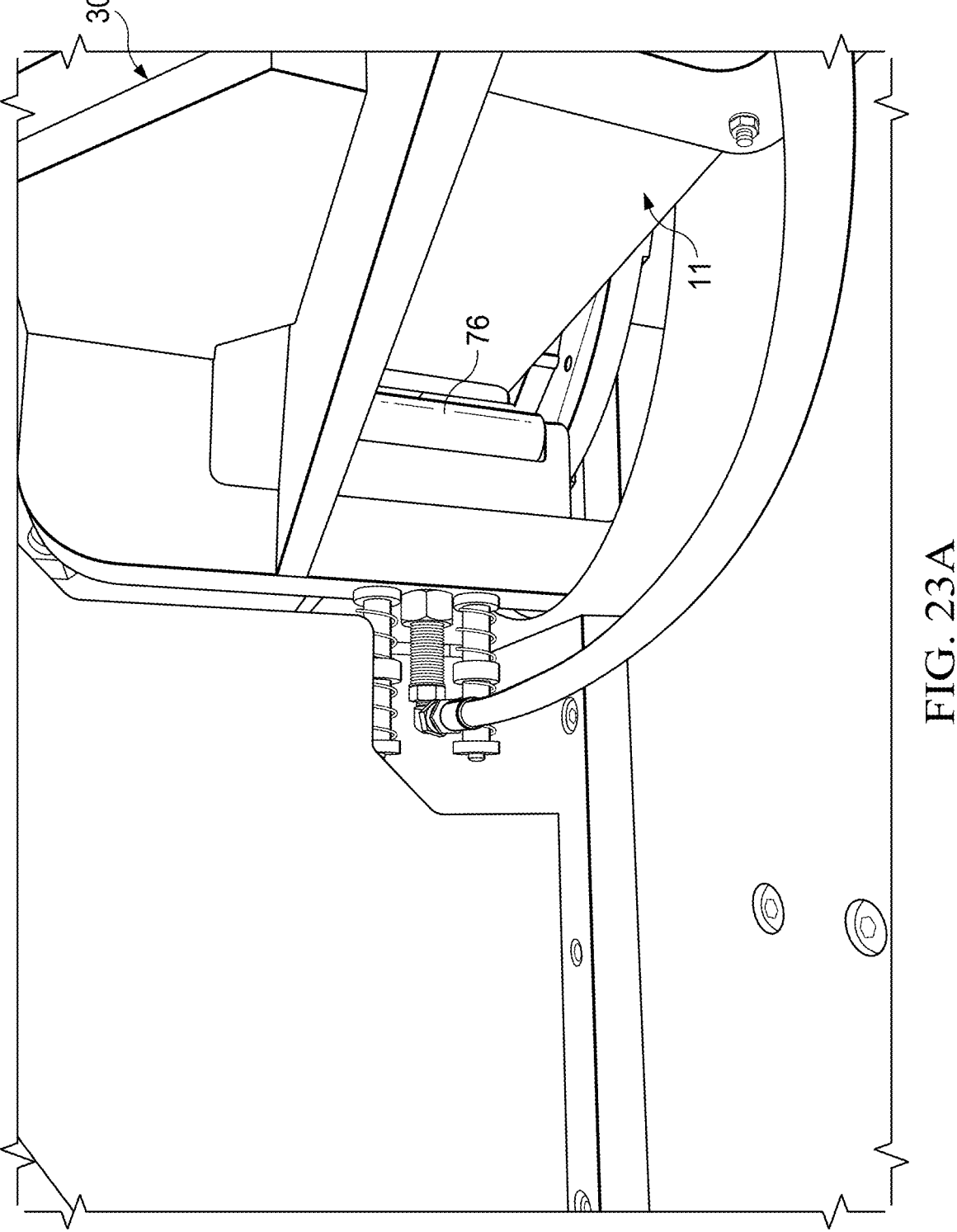
FIG. 23A is a detailed rear perspective view of the portion of the manufacturing system of FIG. 19.
Figure 23B:
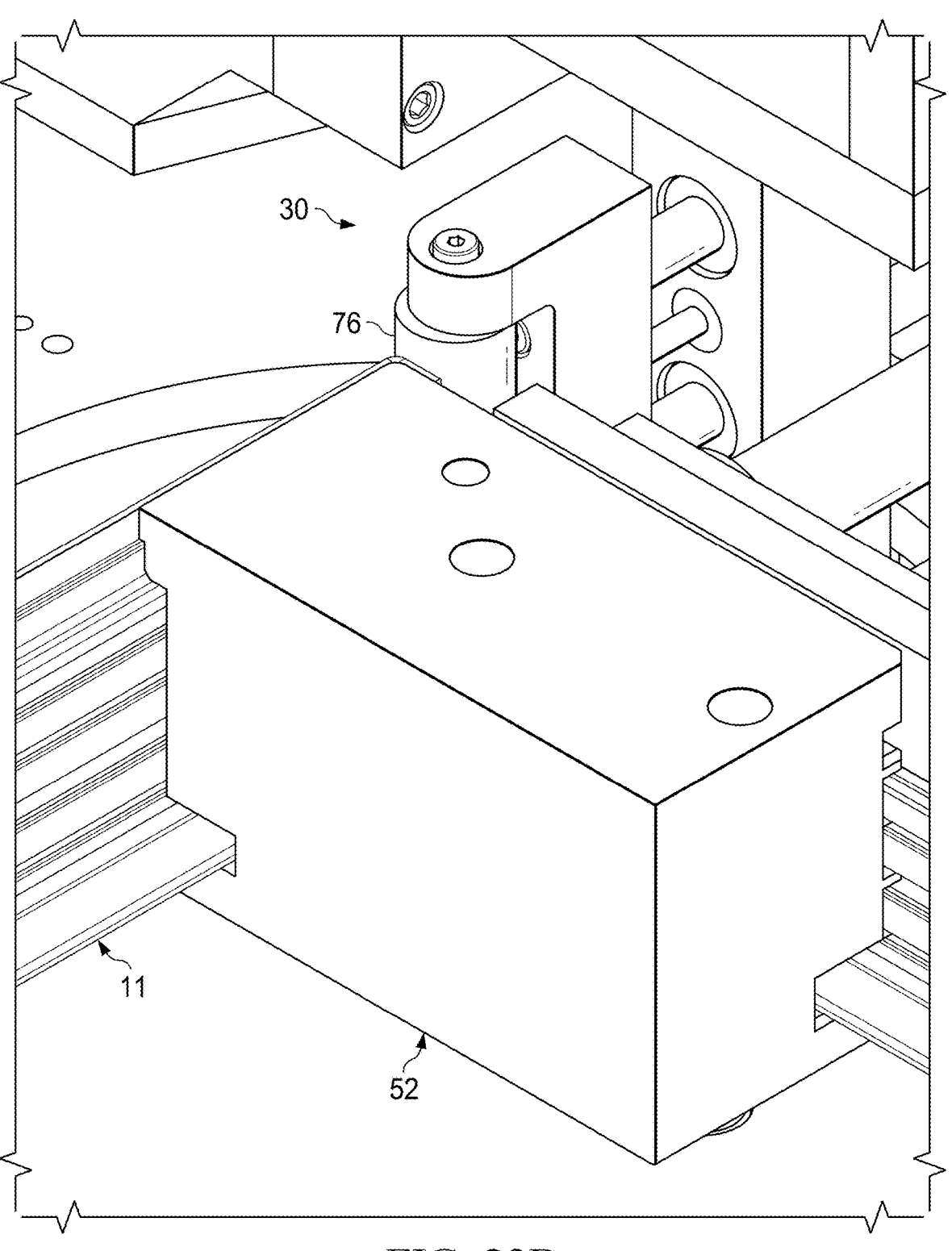
FIG. 23B is a detailed front perspective view of the portion of the manufacturing system of FIG. 23A with a roller and a clamp in a first position.
Figure 23C:
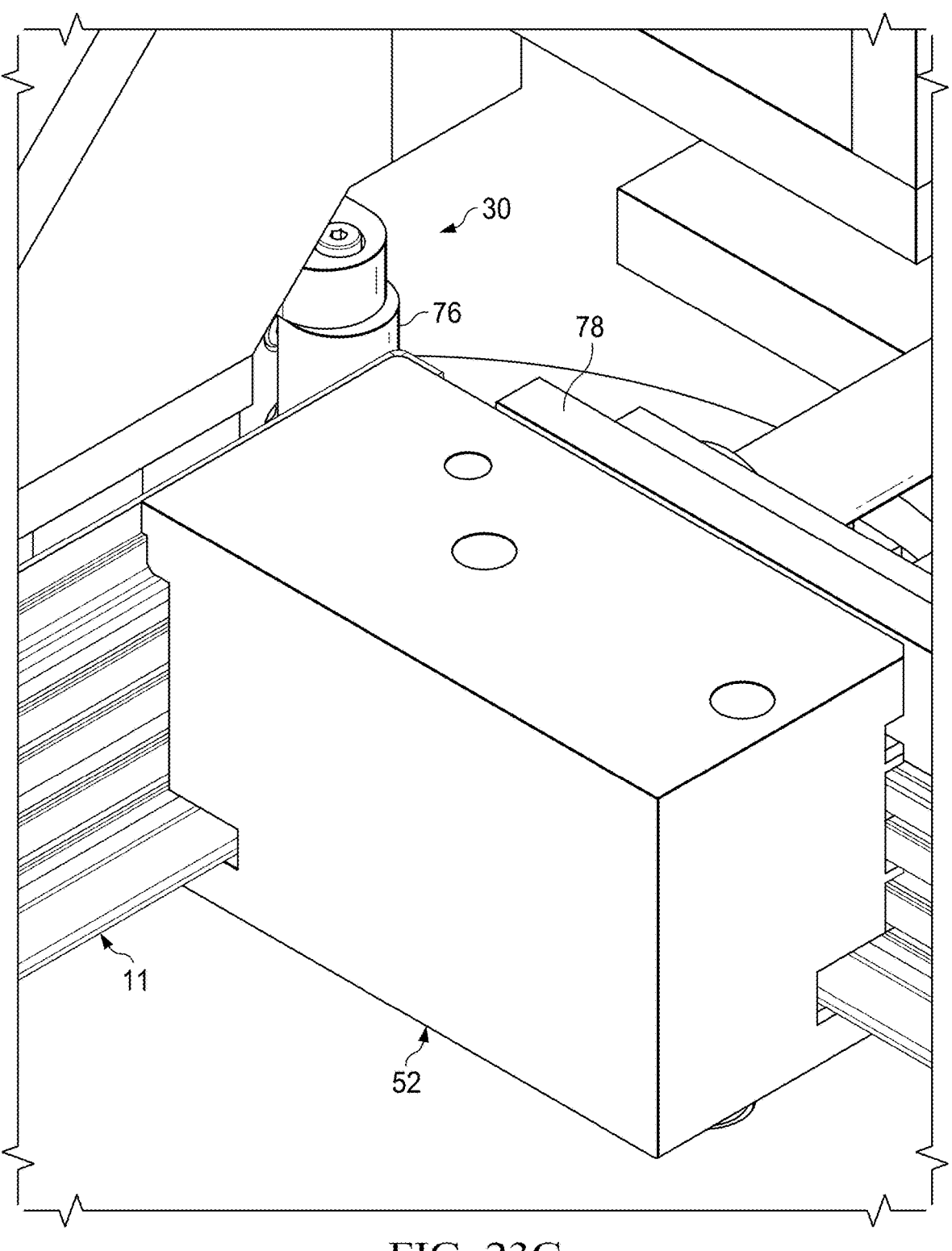
FIG. 23C is a detailed front perspective view of the portion of the manufacturing system of FIG. 23B with the roller and the clamp in a second position.

With particular regard to at least FIGS. 11 and 14, the bracket 24 may comprise apertures 29 for fasteners 25. The fasteners 25 may be used to secure the bracket 24 to the frame 12, thereby joining the frame 12. Alternatively, or additionally, the frame 12 may be joined by welding, adhesive, or the like. The brackets 24 and fasteners 25 may be, alternatively or additionally, used in other locations for other purposes, such as reinforcement.

In exemplary embodiments, without limitation, the fasteners 25 may each comprise a shaft 27 which is extended through a respective one of the apertures 29. At least a portion of the shaft 27 (e.g., proximal end) may be threaded, such as for receiving a nut 31 or other component which is used to secure the fastener 25 to the bracket 24, and thereby the bracket 24 to the frame 12.

An opposing end (e.g., distal end) of the shaft 27 may comprise a securing portion 33. The securing portion 33 may comprise a surface which extends beyond an outer surface of the shaft 27. In exemplary embodiments, without limitation, the securing portion 33 may comprise a substantially rectangular and/or cuboidal shape which extends laterally beyond the outer surface of the shaft 27. The securing portion 33 may be configured to fit within at least a respective one of the channels 28 of the frame 12, thereby assisting with securing the bracket 24 in place.

The bracket 24 may further comprise, and/or be configured to accommodate, pins 35. The pins 35 may be spaced apart at the bracket 24, preferably above and below the aperture 29 for the fasteners 25. The pins 35 may be configured to fit within at least respective one or ones of the channels 28 of the frame 12, thereby assisting with securing the bracket 24 in place.

In exemplary embodiments, without limitation, the bracket 24 comprises four aligned apertures 29 for four fasteners 25, with eight pins 35 (one above and one below each aperture 29) though the number and/or arrangement of the apertures 29, fasteners 25, and pins 35 may be varied.

Welding and/or adhesive may be used as an alternative to, or in addition to, the bracket 24 and/or fasteners 25. A wide variety of types and/or kinds of fasteners 25 may, alternatively or additionally, be utilized. The bracket 24 may alternatively, or additionally, be provided in the form of an intake grill or other component.

FIG. 17 through FIG. 23C illustrate another exemplary embodiment of the bending machine 30. The bending machine 30 may comprise a table subassembly 80. The table subassembly 80 may comprise, for example without limitation, table surfaces, legs, combinations thereof, and the like.

Some or all of the table subassembly 80 may be adjustable, such as the legs and/or table surfaces thereof. The table subassembly 80 may be sized or otherwise configured to support the frame 11 during its formation process. As used herein, the term "frame" includes the material ultimately making up the frame 11, such as the material bent into the frame shape.

The bending machine 30 may comprise a bending arm 70. The bending arm 70 may be pivotable to bend the frame 11, such as about a bending die 52, which may be fixed to the table subassembly 80. The bending arm 70 may comprise a handle 72 for manual actuation. However, in exemplary embodiment, without limitation, the bending arm 70 is hydraulically operable, such as by way of a hydraulic supply 74 and/or piston. The bending arm 70, in exemplary embodiments, without limitation, is configured for movement between 75-105 degrees, preferably at substantially (e.g., +/−5 degrees) 90 degrees. The bending arm 70 may comprise a fixed portion and a bending portion. Alternatively, or additionally, some or all of the fixed portion may be provided by a fence, which may be part of, or separate from, the bending arm 70 and/or bending portion thereof.

The bending machine 30 may comprise a clamp 78, which may be hydraulically controlled in exemplary embodiments, though it may be manually or otherwise controllable in other exemplary embodiments. The clamp 78 may be configured to hold portions of the frame 11 in place, such as during bending by the bending arm 70.

A block 81 may be positioned between a forward surface of the clamp 78 and the frame 11. The block 81 may be configured to reduce or eliminate marring or other damage to the frame 11. The block 81 may comprise one or more ultra high molecular weight (UHMW) materials, by way of non-limiting example.

A spring back stop 82 may be fixed, such as to the table subassembly 80. The spring back stop 82 may be arranged to contact the frame 11 at or near completed bending of the bending arm 70, in exemplary embodiments.

The bending machine 30 may comprise one or more heating elements 84. The heating element(s) 84 may be provided at the table subassembly 80, preferably aligned or substantially aligned (e.g., within 20 degrees) of a longitudinal axis of the bending arm 70 when the bending arm 70 is in an unbent position and/or a fixed portion and/or fence thereof. The heating element(s) 84 may comprise inductive heaters, though other types and kinds of heating elements may be provided, such as but not limited to propane. The use of the heating element(s) 84 is optional and may not be required, such as where the frame 11 material is sufficiently ductile. The position of the heating element(s) 84 may be adjustable, such as along portions of the frame 11 to be bent, thereby heating those portions of the frame 11 prior to bending.

The bending machine 30 may comprise a roller 76. The roller 76 may be located at, or proximate to, the bending die 52. In exemplary embodiments, without limitation, the roller 76 is positioned such that a portion of the frame 11 may be sandwiched between the bending die 52 and the roller 76, when in use. The roller 76 may be actuatable between a first position where it is out of contact with the frame 11 and a second position where it contacts, and preferably places pressure on, the frame 11. The roller 76, in exemplary embodiments, without limitation, may be hydraulically actuated. As illustrated with particular regard to at least FIGS. 23A-23C, the roller 76 may be movable, such as by way of one or more motors, along an arc shaped pathway so as to smooth and/or round the corners 22 such as during or after bending. In exemplary embodiments, without limitation, the roller(s) 76 are fixed to the bending arm 70 such that they rotate therewith, such as to provide the arc shaped motion. This also keeps the roller(s) 76 in contact with the corner 22 during formation.

The roller(s) 76 may be hydraulically controlled, such as to place the roller(s 76 into and out of contact with the corners 22. For example, without limitation, the bending arm 70 may be actuated a first time with the roller(s) 76 in a first position out of contact with the frame 11 while the corner is bent. The roller(s) 76 may be moved, such as hydraulically, into a second position whereby the roller(s) 76 contact the frame 11. The bending arm 70 may be actuated in reverse and/or a second or further time to roll the formed corner 22. In other exemplary embodiments, without limitation, the corner 22 may be formed while the roller(s) 76 are in contact with the frame 11 (e.g., in the first position), thereby forming and rolling simultaneously. Multiple roller passes (without additional bending) may optionally be utilized. The same or different process may be used for each of the corners 22.

In exemplary embodiments, without limitation, the roller(s) 76 is applied to the frame 11 during and/or after bending by the bending arm 70, thereby assisting with producing the rounded corners 22 of the frame 11. The bent portion or portions (e.g., areas to be formed into the corners 22) may be heated by the heating element(s) 84 pre-bending and/or at other times.

The bending machine 30 may comprise one or more control interfaces 86. The control interface(s) 86 may comprise buttons, knobs, displays, gauges, sliders, combinations thereof, or the like, such as for manually controlling operations of the bending arm 70, the roller 76, and/or the clamp 78, by way of non-limiting example. In other exemplary embodiments, without limitation, some or all of the controls may be automated, such as by way of one or more controller (e.g., electronic storage devices, processors, PLCs, combinations thereof, or the like). Operations may be controlled, at least in part, based on data received from one or more sensors, which may, for example without limitation, indicate presence of the frame 11, operations of the bending machine 30, combinations thereof, or the like. Alternatively, or additionally, some or all operations may be manually controlled by an operator.

Optionally, the heating elements 84 may be retractable into the table subassembly 80, such as to selectively provide a flat workspace. The table subassembly 80 may include one or more removable panels which allow an operator to be centrally located.

Figure 24:
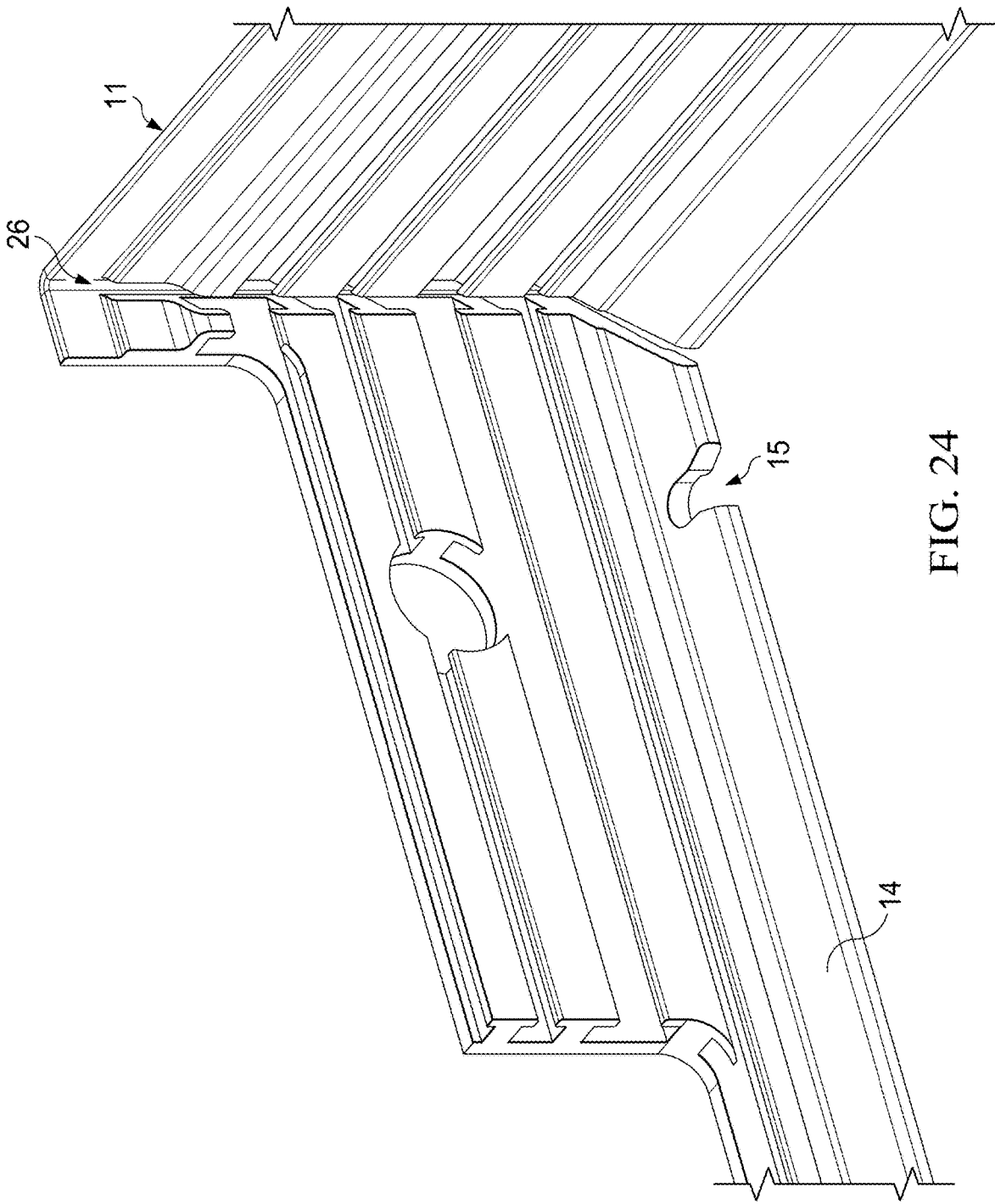
FIG. 24 is a detailed view of another exemplary embodiment of the door frame assembly of FIG. 4.

As illustrated with particular regard to FIG. 24, the frame 11 may comprise one or more securing notches 15. In exemplary embodiments, without limitation, the securing notches 15 are positioned to interface with at least one or more posts 62 on the bending die 52. At least one securing notch 15 may be provided at, proximate, and/or for each corner 22, such as to facilitate creation of the same by assisting with holding the frame 11 during bending. In exemplary embodiments, without limitation, the securing notches 15 are positioned at the ledge 14 of the frame 11 and extend inward from an edge thereof. The corner notches 26 may extend in a first direction, such as vertical, and the securing notches 15 may extend in a second direction, such as horizontal. Alternatively, or additionally, the securing notches 15 may be located at the perimeter surface 13, the channels 28, and/or other portion of the frame 11.

Figure 25:
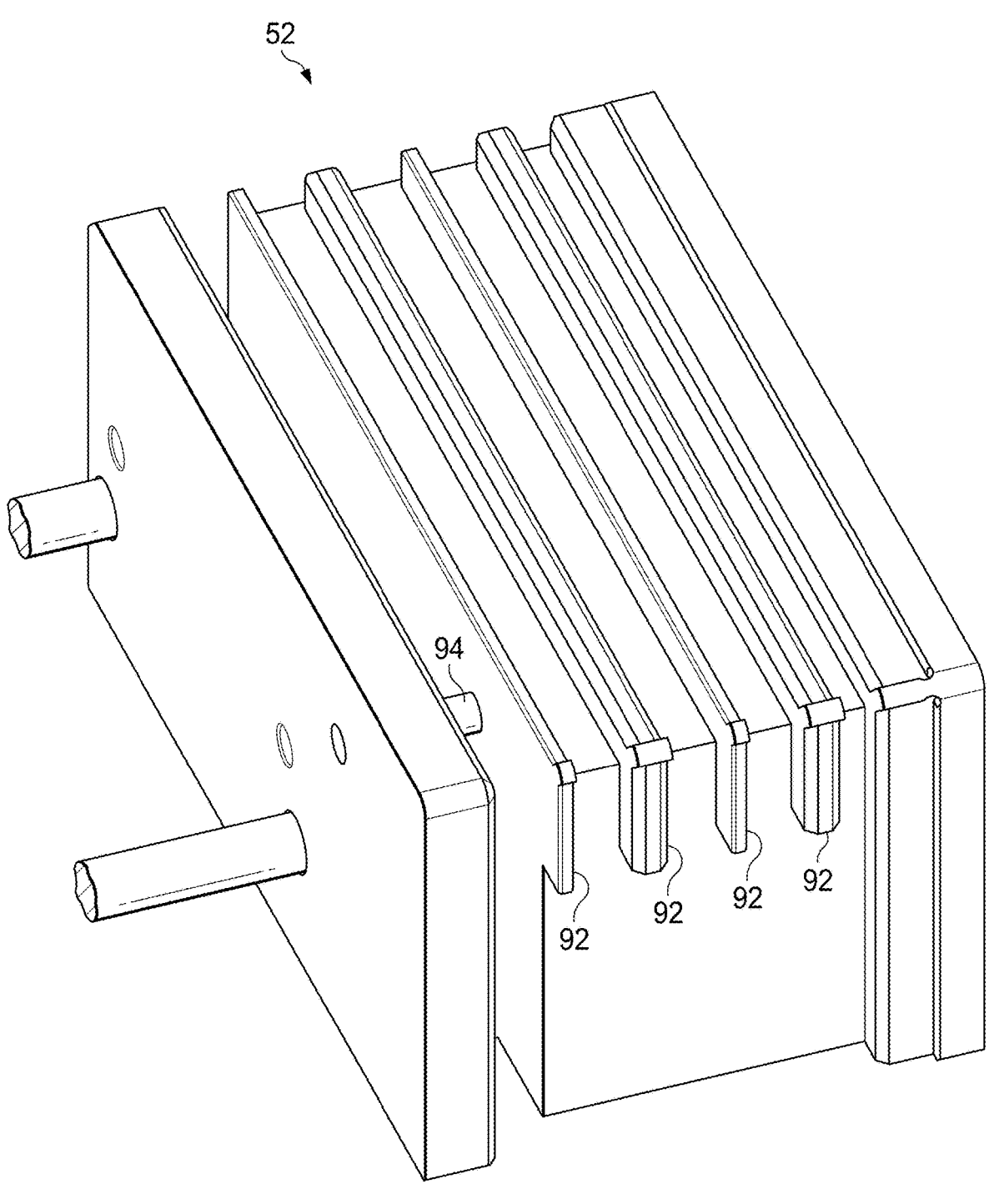
FIG. 25 is a perspective view of the bending die for use with the bending machine of FIGS. 17-23C.
Figure 26:
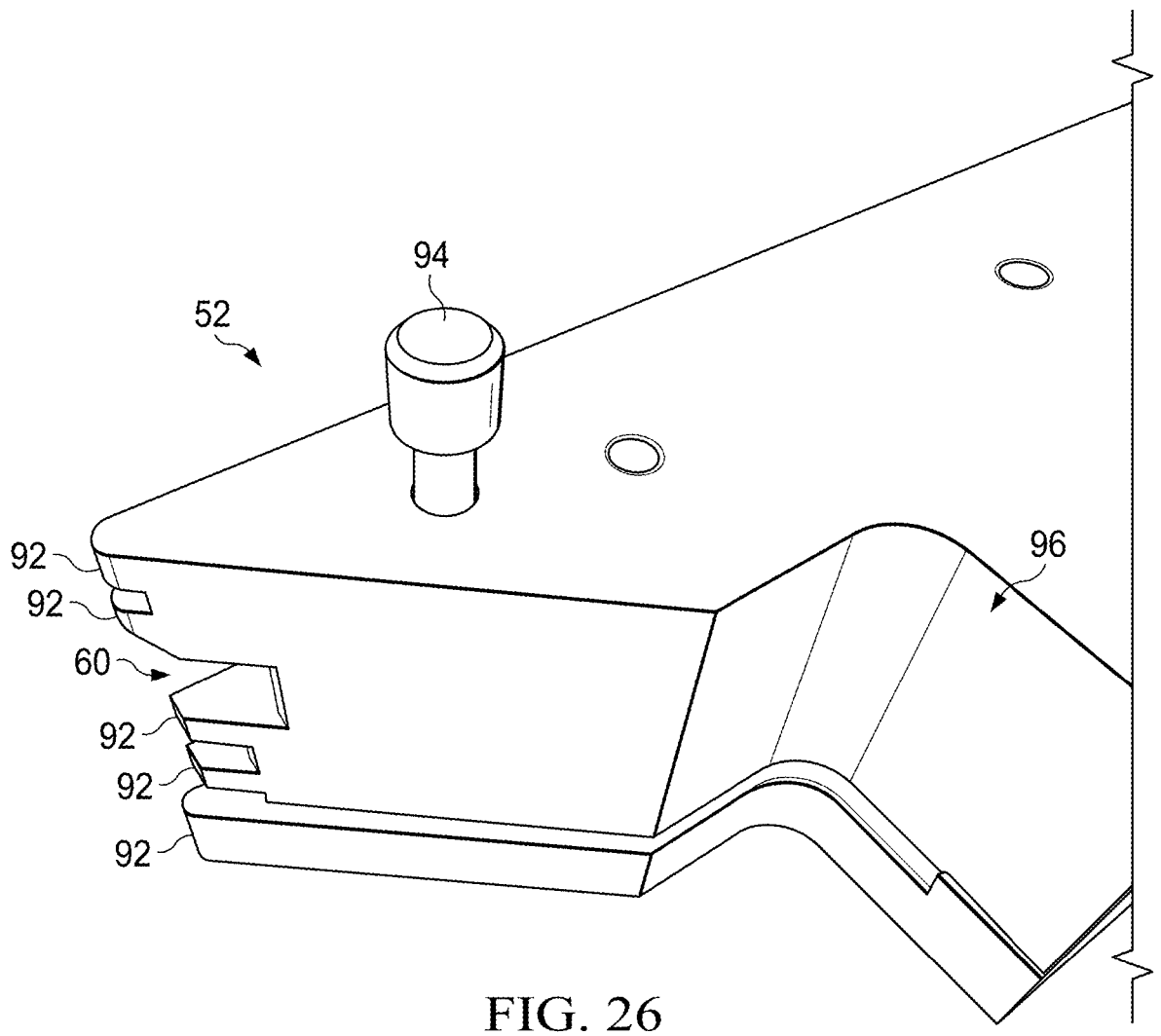
FIG. 26 is a perspective view of another exemplary embodiment of the bending die for use with the bending machine of FIGS. 17-23C.

As illustrated with particular regard to FIG. 25 and FIG. 26, the bending die 52 may comprise one or more structures 92, preferably extending from an otherwise at least substantially (e.g., within 20%) flat surface thereof, configured to align the frame 11, such as by placing the structures 92 within the channels 28 thereof. The bending die 52 may include a locating pin 94, such as for placement in the securing notches 15. As illustrated in FIG. 26, the bending die 52 may comprise a cut back section 96, such as to facilitate over-bending of the frame 11, such as up to an additional 1-10 degrees, more preferably about 3 degrees, such as to account for spring back.

Figure 27:
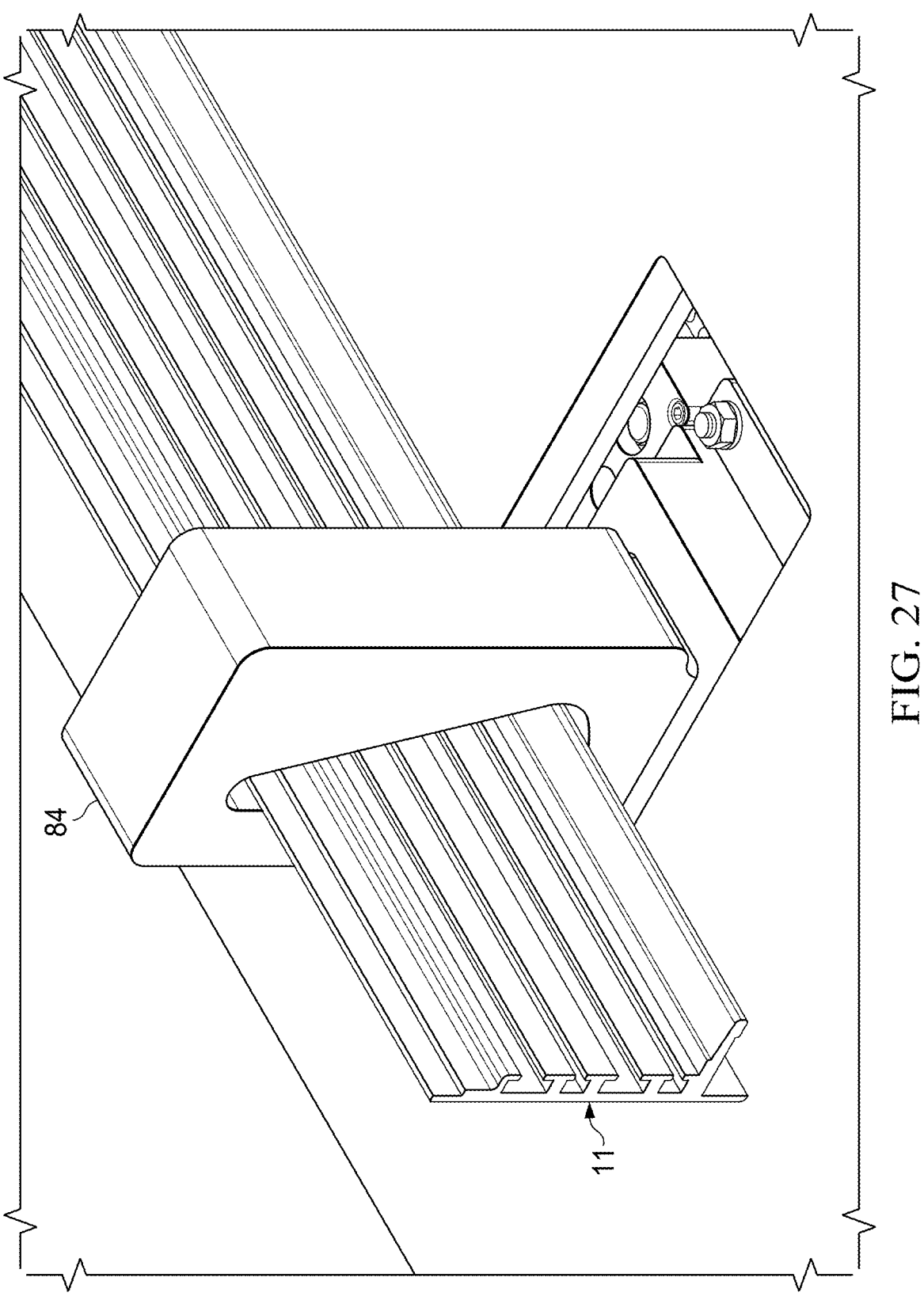
FIG. 27 is a perspective view of an exemplary heating coil for use with the bending machine of FIGS. 17-23C.

As illustrated with particular regard to FIG. 27, the heating coil 84 may optionally be shaped to contour to the frame 11.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A method of manufacturing a door frame subassembly for an electronic display assembly, said method comprising:

extruding metal for a frame, including forming a perimeter surface and a ledge for receiving a cover layer of the electronic display assembly, where the ledge is recessed from an upper edge and a lower edge of the perimeter surface such that at least a majority of the perimeter surface, including the lower edge, extends on a first side of the ledge and where the ledge extends outward at least substantially perpendicular from, and extends along, an interior facing surface of the perimeter surface;

bending the extruded metal into a rectangular shape with rounded corners defining an opening with a remaining gap, wherein the recessed ledge extends into said opening;

joining the remaining gap;

installing said cover layer to a first surface of said recessed ledge facing said upper edge, wherein the cover layer is transparent or translucent; and installing said door frame subassembly to a remainder of the electronic display assembly such that said cover layer is positioned forward of an electronic display layer of the electronic display assembly and a second surface of said recessed ledge opposing said first surface faces an interior of the electronic display assembly and said lower edge of said perimeter surface.

2. The method of claim 1 further comprising:

forming corner notches in the extruded metal at anticipated locations of the corners, wherein the step of bending the extruded metal comprises bending the frame at the corner notches to form the corners and at least partially close the corner notches.

3. The method of claim 1 wherein:

the step of joining the remaining gap comprises installing a bracket at a lower portion of said opening and across the remaining gap to secure the bent, extruded metal to itself.

4. The method of claim 2 further comprising:

forming, as part of said extrusion, spaced apart channels in said interior of the perimeter surface such that said channels extend alongside one another and about said interior perimeter of the perimeter surface, wherein the step of bending the extruded metal comprises bending at the corner notches about an angled surface of a bending die at least until said channels contact said angled surface.

5. The method of claim 4 further comprising:

forming a securing notch adjacent to each of the corner notches in the extruded metal; and placing a pin of the bending die within the securing notch when forming each of the corners.

6. The method of claim 5 further comprising:

providing a bending machine, where the bending machine comprises the bending die, a clamp, and a bending arm for bending the extruded metal at each of the corner notches.

7. The method of claim 6 further comprising:

applying heat while bending the extruded metal into the rectangular shape, wherein the bending machine comprises one or more heating devices.

8. The method of claim 7 wherein:

the one or more heating devices comprise an inductive heater; and the metal comprises an aluminum alloy.

9. The method of claim 6 further comprising:

applying a roller of the bending machine to a portion of the extruded metal located at the bending die to sandwich the portion of the extruded metal between the roller and the bending die, wherein at least the clamp of the bending machine is hydraulically controlled, the roller is attached to the bending arm for movement therewith, and at least the bending die is fixed to a table subassembly of or for the bending machine.

10. The method of claim 1 further comprising:

installing reinforcement brackets to upper, interior portions of the corners of the extruded metal, after formed.

11. The method of claim 1 further comprising:

installing a first mounting bracket component to an interior of said door frame subassembly; and connecting the first mounting bracket component to a second, complementary mounting bracket component provided at the electronic display assembly.

12. The method of claim 1 wherein:

the corners have an outer radius of between about 0.01 to 0.5 inches nominally when formed.

13. The method of claim 8 wherein:

said inductive heater comprises a heating coil arranged about an opening shaped to accommodate, and contour to, the extruded metal, including the perimeter surface and ledge thereof.

* * * * *